(12) United States Patent
Fletcher et al.

(10) Patent No.: US 7,162,875 B2
(45) Date of Patent: Jan. 16, 2007

(54) METHOD AND SYSTEM FOR CONTROLLING FUEL SUPPLY IN A COMBUSTION TURBINE ENGINE

(75) Inventors: Paul Fletcher, Rugby (GB); Philip P Walsh, Birmingham (GB)

(73) Assignee: Rolls-Royce plc, London (GB)

( * ) Notice: Subject to any disclaimer, the term of this patent is extended or adjusted under 35 U.S.C. 154(b) by 279 days.

(21) Appl. No.: 10/954,085

(22) Filed: Sep. 30, 2004

(65) Prior Publication Data

US 2005/0166595 A1 Aug. 4, 2005

(30) Foreign Application Priority Data

Oct. 4, 2003 (GB) .................... 0323255.0

(51) Int. Cl.
*F02C 9/28* (2006.01)
(52) U.S. Cl. .................. 60/773; 60/39.281; 60/746
(58) Field of Classification Search ............ 60/39.281, 60/734, 746, 747, 773
See application file for complete search history.

(56) References Cited

U.S. PATENT DOCUMENTS

| | | | |
|---|---|---|---|
| 4,112,676 A | | 9/1978 | DeCorso |
| 4,716,719 A | | 1/1988 | Takahashi et al. |
| 4,920,740 A | * | 5/1990 | Shekleton ............... 60/790 |
| 4,949,538 A | * | 8/1990 | Iasillo et al. ........... 60/39.465 |
| 5,339,636 A | * | 8/1994 | Donnelly et al. ........... 60/734 |
| 5,802,854 A | * | 9/1998 | Maeda et al. ............ 60/737 |

FOREIGN PATENT DOCUMENTS

| | | |
|---|---|---|
| EP | 0 529 900 A | 3/1993 |
| EP | 0529900 A | 3/1993 |
| EP | 0810405 A | 12/1997 |
| EP | 0 680 554 A | 6/1998 |
| EP | 0 680 554 SP | 6/1998 |
| EP | 0 765 998 SP | 7/2001 |

\* cited by examiner

*Primary Examiner*—L. J. Casaregola
(74) *Attorney, Agent, or Firm*—W. Warren Taltavull; Manelli Denison & Selter PLLC

(57) ABSTRACT

In order to regulate fuel flow to the combustor (36) of the combustion turbine engine (10) having a primary combustion zone (64) and at least one further combustion zone, the temperature of the inlet and outlet of the combustor (36) are determined, as are first and second values representing first and second properties, with the first property being one of: the total enthalpy rise in the combustor (36), the equivalence ratio of the combustor (36), the fuel/air ratio of said combustor (36), the fuel flow through the combustor, and the second property being one of: the enthalpy rise in the primary zone (64), the equivalence ratio of said primary zone (64), the fuel/air ratio of the primary zone(64); the temperature rise across the primary zone(64), or the fuel flow through the primary zone (64). The second property is determined from the first value and the current value of the ratio of the fuel to the primary zone (64) to the total fuel to the combustor (36). The temperature of the outlet of the primary zone (64) is thus determined from the inlet temperature and the second value, are compared with a predetermined temperature to generate a control signal dependent on the difference. The fuel to the primary zone (64) is then varied, to vary the control signal to reduce the difference. This use of ratios eliminates the need for a gas chromatograph, flow ratios and humidity sensors to determine the properties of the gas.

5 Claims, 57 Drawing Sheets

Figure 1:
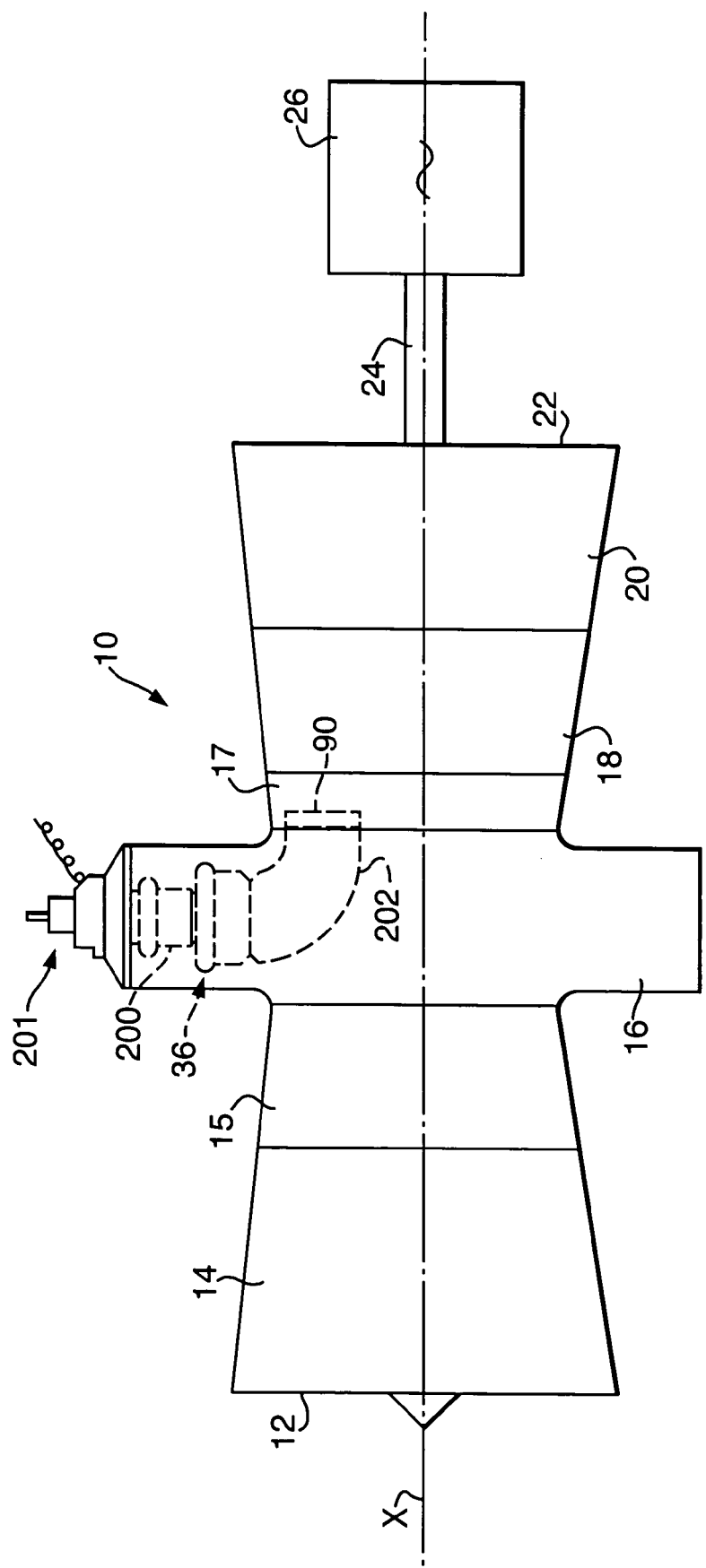

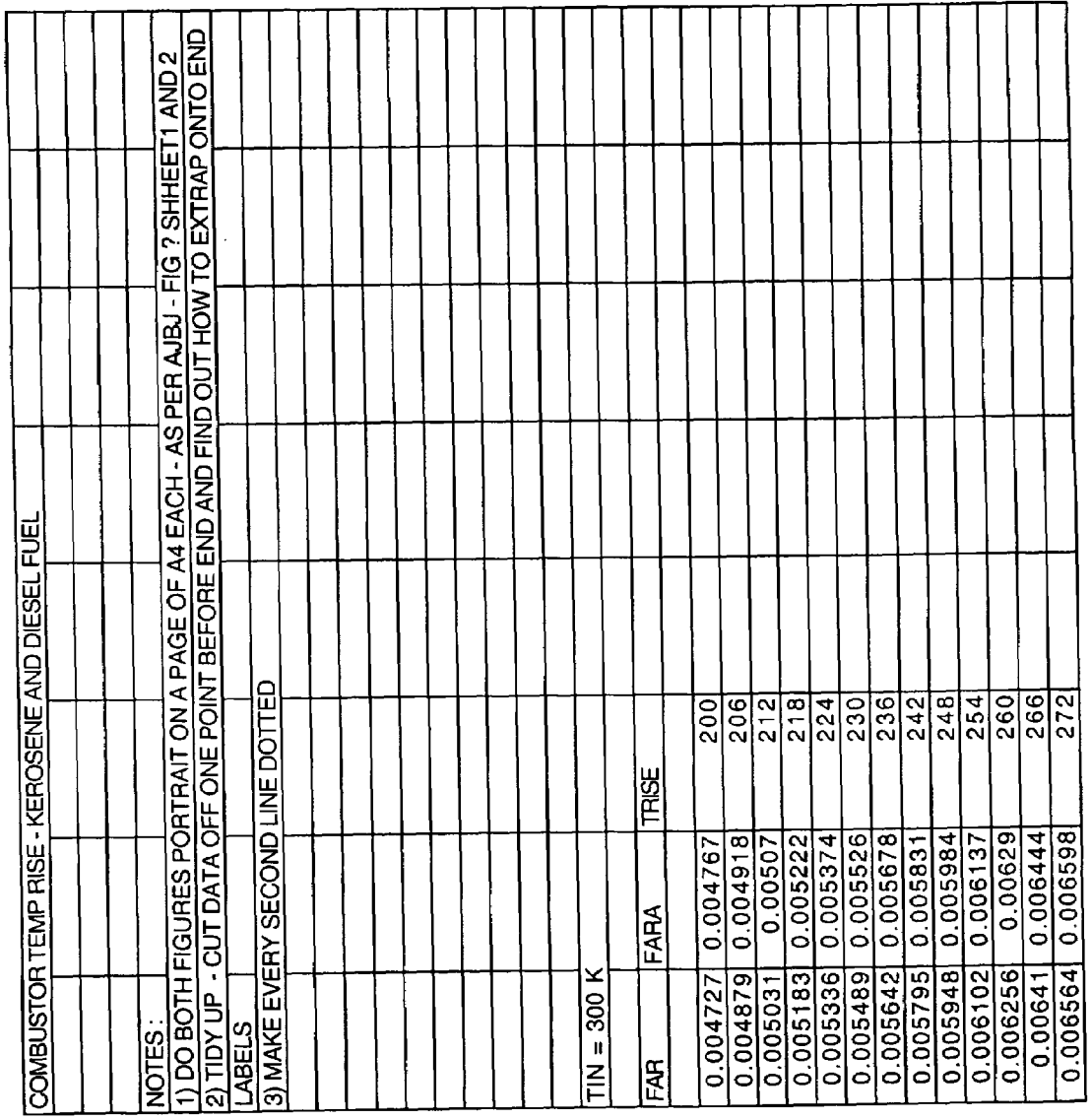
Fig.9.01.

Fig.9.02.

| | | |
|---|---|---|
| 0.006718 | 0.006752 | 278 |
| 0.006873 | 0.006906 | 284 |
| 0.007028 | 0.00706 | 290 |
| 0.007184 | 0.007215 | 296 |
| 0.007339 | 0.00737 | 302 |
| 0.007495 | 0.007525 | 308 |
| 0.007651 | 0.007681 | 314 |
| 0.007807 | 0.007836 | 320 |
| 0.007963 | 0.007992 | 326 |
| 0.00812 | 0.008148 | 332 |
| 0.008277 | 0.008305 | 338 |
| 0.008434 | 0.008461 | 344 |
| 0.008591 | 0.008618 | 350 |
| 0.008749 | 0.008775 | 356 |
| 0.008907 | 0.008932 | 362 |
| 0.009065 | 0.00909 | 368 |
| 0.009223 | 0.009248 | 374 |
| 0.009382 | 0.009406 | 380 |
| 0.009541 | 0.009564 | 386 |
| 0.0097 | 0.009723 | 392 |
| 0.009859 | 0.009882 | 398 |
| 0.010019 | 0.010041 | 404 |
| 0.010179 | 0.0102 | 410 |
| 0.010339 | 0.01036 | 416 |
| 0.0105 | 0.01052 | 422 |
| 0.010661 | 0.01068 | 428 |
| 0.010821 | 0.01084 | 434 |
| 0.010982 | 0.011001 | 440 |
| 0.011144 | 0.011162 | 446 |
| 0.011306 | 0.011323 | 452 |
| 0.011467 | 0.011485 | 458 |
| 0.011630 | 0.011646 | 464 |
| 0.011792 | 0.011808 | 470 |
| 0.011955 | 0.011971 | 476 |
| 0.012118 | 0.012133 | 482 |
| 0.012281 | 0.012296 | 488 |

Fig.9.03.

| | |
|---|---|
| 0.012445 | 0.012459 | 494 |
| 0.012609 | 0.012622 | 500 |
| 0.012773 | 0.012786 | 506 |
| 0.012938 | 0.01295 | 512 |
| 0.013102 | 0.013114 | 518 |
| 0.013267 | 0.013278 | 524 |
| 0.013433 | 0.013443 | 530 |
| 0.013598 | 0.013608 | 536 |
| 0.013764 | 0.013774 | 542 |
| 0.013930 | 0.013939 | 548 |
| 0.014097 | 0.014105 | 554 |
| 0.014263 | 0.014271 | 560 |
| 0.014430 | 0.014438 | 566 |
| 0.014598 | 0.014605 | 572 |
| 0.014765 | 0.014772 | 578 |
| 0.014933 | 0.014939 | 584 |
| 0.015101 | 0.015107 | 590 |
| 0.015270 | 0.015275 | 596 |
| 0.015439 | 0.015443 | 602 |
| 0.015608 | 0.015611 | 608 |
| 0.015777 | 0.01578 | 614 |
| 0.015947 | 0.015949 | 620 |
| 0.016117 | 0.016119 | 626 |
| 0.016287 | 0.016289 | 632 |
| 0.016458 | 0.016459 | 638 |
| 0.016629 | 0.016629 | 644 |
| 0.0168 | 0.0168 | 650 |
| 0.016971 | 0.016971 | 656 |
| 0.017141 | 0.017142 | 662 |
| 0.017312 | 0.017314 | 668 |
| 0.017484 | 0.017486 | 674 |
| 0.017656 | 0.017658 | 680 |
| 0.017828 | 0.017831 | 686 |
| 0.018 | 0.018004 | 692 |
| 0.018173 | 0.018177 | 698 |
| 0.018346 | 0.018351 | 704 |

Fig.9.04.

| | |
|---|---|
| 0.018852 | 0.018525 | 710
| 0.018693 | 0.018699 | 716
| 0.018867 | 0.018874 | 722
| 0.019042 | 0.019049 | 728
| 0.019217 | 0.019224 | 734
| 0.019392 | 0.0194 | 740
| 0.019567 | 0.019576 | 746
| 0.019743 | 0.019752 | 752
| 0.019919 | 0.019929 | 758
| 0.020007 | 0.020017 | 761
| 0.020273 | 0.020283 | 770
| 0.02045 | 0.020461 | 776
| 0.020627 | 0.020639 | 782
| 0.020805 | 0.020818 | 788
| 0.020984 | 0.020996 | 794
| 0.021162 | 0.021176 | 800
| 0.021341 | 0.021355 | 806
| 0.021521 | 0.021535 | 812
| 0.0217 | 0.021715 | 818
| 0.021881 | 0.021896 | 824
| 0.022061 | 0.022077 | 830
| 0.022242 | 0.022259 | 836
| 0.022423 | 0.02244 | 842
| 0.022605 | 0.022623 | 848
| 0.022787 | 0.022805 | 854
| 0.022969 | 0.022988 | 860
| 0.023152 | 0.023171 | 866
| 0.023335 | 0.023355 | 872
| 0.023519 | 0.023539 | 878
| 0.023703 | 0.023724 | 884
| 0.023887 | 0.023909 | 890
| 0.024072 | 0.024094 | 896
| 0.024257 | 0.02428 | 902
| 0.024443 | 0.024466 | 908
| 0.024629 | 0.024652 | 914
| 0.024815 | 0.024839 | 920

Fig.9.05.

| | | | |
|---|---|---|---|
| 0.025002 | 0.025027 | 926 | |
| 0.02519 | 0.025215 | 932 | |
| 0.025377 | 0.025403 | 938 | |
| 0.025565 | 0.025591 | 944 | |
| 0.025754 | 0.025781 | 950 | |
| 0.025943 | 0.02597 | 956 | |
| 0.026132 | 0.02616 | 962 | |
| 0.026322 | 0.02635 | 968 | |
| 0.026512 | 0.026541 | 974 | |
| 0.026703 | 0.026732 | 980 | |
| 0.026894 | 0.026924 | 986 | |
| 0.027086 | 0.027116 | 992 | |
| 0.027278 | 0.027309 | 998 | |
| 0.02747 | 0.027502 | 1004 | |
| 0.027663 | 0.027695 | 1010 | |
| 0.027857 | 0.027889 | 1016 | |
| 0.028051 | 0.028084 | 1022 | |
| 0.028245 | 0.028279 | 1028 | |
| 0.02844 | 0.028474 | 1034 | |
| 0.028635 | 0.02867 | 1040 | |
| 0.028831 | 0.028866 | 1046 | |
| 0.029027 | 0.029063 | 1052 | |
| 0.029224 | 0.02926 | 1058 | |
| 0.029421 | 0.029458 | 1064 | |
| 0.029619 | 0.029656 | 1070 | |
| 0.029817 | 0.029855 | 1076 | |
| 0.030016 | 0.030054 | 1082 | |
| 0.030215 | 0.030254 | 1088 | |
| 0.030415 | 0.030454 | 1094 | |
| 0.030615 | 0.030655 | 1100 | |
| TIN = 400 K | | | |

Fig.9.06.

| FAR | FARA | TRISE |
|---|---|---|
| 0.004842 | 0.004873 | 200 |
| 0.004997 | 0.005028 | 206 |
| 0.005152 | 0.005182 | 212 |
| 0.005308 | 0.005337 | 218 |
| 0.005463 | 0.005492 | 224 |
| 0.005619 | 0.005648 | 230 |
| 0.005776 | 0.005803 | 236 |
| 0.005932 | 0.005959 | 242 |
| 0.006089 | 0.006115 | 248 |
| 0.006245 | 0.006272 | 254 |
| 0.006402 | 0.006428 | 260 |
| 0.00656 | 0.006585 | 266 |
| 0.006717 | 0.006742 | 272 |
| 0.006875 | 0.006899 | 278 |
| 0.007033 | 0.007057 | 284 |
| 0.007192 | 0.007215 | 290 |
| 0.00735 | 0.007373 | 296 |
| 0.007509 | 0.007531 | 302 |
| 0.007668 | 0.00769 | 308 |
| 0.007828 | 0.007849 | 314 |
| 0.007987 | 0.008008 | 320 |
| 0.008147 | 0.008167 | 326 |
| 0.008307 | 0.008326 | 332 |
| 0.008467 | 0.008486 | 338 |
| 0.008628 | 0.008646 | 344 |
| 0.008789 | 0.008807 | 350 |
| 0.00895 | 0.008967 | 356 |
| 0.009112 | 0.009128 | 362 |
| 0.009273 | 0.009289 | 368 |
| 0.009435 | 0.009451 | 374 |
| 0.009597 | 0.009612 | 380 |
| 0.00976 | 0.009774 | 386 |
| 0.009923 | 0.009937 | 392 |

Fig.9.07.

| | | |
|---|---|---|
| 0.0100086 | 0.010099 | 398 |
| 0.0100249 | 0.010262 | 404 |
| 0.0100412 | 0.010425 | 410 |
| 0.0100576 | 0.0105588 | 416 |
| 0.01010074 | 0.0105752 | 422 |
| 0.0100905 | 0.0105916 | 428 |
| 0.0110269 | 0.0105108 | 434 |
| 0.0111234 | 0.0111244 | 440 |
| 0.01114 | 0.0114109 | 446 |
| 0.0115665 | 0.0115574 | 452 |
| 0.0117331 | 0.0117739 | 458 |
| 0.0118897 | 0.0118905 | 464 |
| 0.0112063 | 0.012207 | 470 |
| 0.0112233 | 0.0112237 | 476 |
| 0.0112397 | 0.0112403 | 482 |
| 0.0112564 | 0.01257 | 488 |
| 0.0112732 | 0.0112737 | 494 |
| 0.01290 | 0.0112904 | 500 |
| 0.0113068 | 0.0113072 | 506 |
| 0.0113236 | 0.01324 | 512 |
| 0.0113405 | 0.0113408 | 518 |
| 0.0113574 | 0.0113576 | 524 |
| 0.0113743 | 0.0113745 | 530 |
| 0.0113913 | 0.0113914 | 536 |
| 0.0114083 | 0.0114084 | 542 |
| 0.0114253 | 0.0114253 | 548 |
| 0.0114423 | 0.0114423 | 554 |
| 0.0114593 | 0.0114594 | 560 |
| 0.0114763 | 0.0114764 | 566 |
| 0.0114933 | 0.0114935 | 572 |
| 0.0115104 | 0.0115107 | 578 |
| 0.0115275 | 0.0115278 | 584 |
| 0.0115447 | 0.01545 | 590 |
| 0.0115618 | 0.0115623 | 596 |
| 0.01579 | 0.0115795 | 602 |
| 0.0115963 | 0.0115968 | 608 |

Fig.9.08.

| | |
|---|---|
| 0.016136 | 0.016141 | 614 |
| 0.016309 | 0.016315 | 620 |
| 0.016482 | 0.016489 | 626 |
| 0.016656 | 0.016663 | 632 |
| 0.016830 | 0.016838 | 638 |
| 0.017004 | 0.017012 | 644 |
| 0.017179 | 0.017188 | 650 |
| 0.017354 | 0.017363 | 656 |
| 0.017529 | 0.017539 | 662 |
| 0.017705 | 0.017716 | 668 |
| 0.017881 | 0.017892 | 674 |
| 0.018058 | 0.018069 | 680 |
| 0.018234 | 0.018246 | 686 |
| 0.018412 | 0.018424 | 692 |
| 0.018589 | 0.018602 | 698 |
| 0.018767 | 0.018781 | 704 |
| 0.018945 | 0.018959 | 710 |
| 0.019124 | 0.019139 | 716 |
| 0.019303 | 0.019318 | 722 |
| 0.019482 | 0.019498 | 728 |
| 0.019662 | 0.019678 | 734 |
| 0.019842 | 0.019859 | 740 |
| 0.020001 | 0.020019 | 745.3 |
| 0.020203 | 0.020221 | 752 |
| 0.020384 | 0.020403 | 758 |
| 0.020566 | 0.020585 | 764 |
| 0.020748 | 0.020767 | 770 |
| 0.02093  | 0.02095  | 776 |
| 0.021113 | 0.021134 | 782 |
| 0.021296 | 0.021317 | 788 |
| 0.02148  | 0.021501 | 794 |
| 0.021663 | 0.021686 | 800 |
| 0.021848 | 0.021871 | 806 |
| 0.022033 | 0.022056 | 812 |
| 0.022218 | 0.022241 | 818 |
| 0.022403 | 0.022428 | 824 |

Fig.9.09.

| | | |
|---|---|---|
| 0.022589 | 0.022614 | 830 |
| 0.022775 | 0.022801 | 836 |
| 0.022962 | 0.022988 | 842 |
| 0.023149 | 0.023176 | 848 |
| 0.023337 | 0.023364 | 854 |
| 0.023525 | 0.023553 | 860 |
| 0.023713 | 0.023742 | 866 |
| 0.023902 | 0.023931 | 872 |
| 0.024092 | 0.024121 | 878 |
| 0.024281 | 0.024311 | 884 |
| 0.024472 | 0.024502 | 890 |
| 0.024662 | 0.024693 | 896 |
| 0.024853 | 0.024885 | 902 |
| 0.025045 | 0.025077 | 908 |
| 0.025237 | 0.025269 | 914 |
| 0.025429 | 0.025462 | 920 |
| 0.025622 | 0.025656 | 926 |
| 0.025815 | 0.025849 | 932 |
| 0.026009 | 0.026044 | 938 |
| 0.026203 | 0.026239 | 944 |
| 0.026398 | 0.026434 | 950 |
| 0.026593 | 0.02663 | 956 |
| 0.026789 | 0.026826 | 962 |
| 0.026985 | 0.027022 | 968 |
| 0.027182 | 0.02722 | 974 |
| 0.027379 | 0.027417 | 980 |
| 0.027577 | 0.027615 | 986 |
| 0.027775 | 0.027814 | 992 |
| 0.027973 | 0.028013 | 998 |
| 0.028173 | 0.028213 | 1004 |
| 0.028372 | 0.028413 | 1010 |
| 0.028572 | 0.028614 | 1016 |
| 0.028773 | 0.028815 | 1022 |
| 0.028974 | 0.029017 | 1028 |
| 0.029176 | 0.029219 | 1034 |
| 0.029378 | 0.029422 | 1040 |

Fig.9.10.

| FAR | FARA | TRISE |
|---|---|---|
| 0.0295581 | 0.029625 | 1046 |
| 0.0297784 | 0.029829 | 1052 |
| 0.0299988 | 0.030033 | 1058 |
| 0.0300192 | 0.030238 | 1064 |
| 0.0300397 | 0.030443 | 1070 |
| 0.0300603 | 0.030649 | 1076 |
| 0.0300809 | 0.030856 | 1082 |
| 0.0301015 | 0.031063 | 1088 |
| 0.0301222 | 0.031271 | 1094 |
| 0.03143 | 0.031479 | 1100 |

TIN = 500 K

| FAR | FARA | TRISE |
|---|---|---|
| 0.004962 | 0.0049984 | 200 |
| 0.00512 | 0.005142 | 206 |
| 0.005278 | 0.005299 | 212 |
| 0.005437 | 0.005458 | 218 |
| 0.005596 | 0.005616 | 224 |
| 0.005755 | 0.005775 | 230 |
| 0.005915 | 0.005934 | 236 |
| 0.006074 | 0.006093 | 242 |
| 0.006234 | 0.006252 | 248 |
| 0.006395 | 0.006412 | 254 |
| 0.006555 | 0.006572 | 260 |
| 0.006716 | 0.006732 | 266 |
| 0.006877 | 0.006893 | 272 |
| 0.007038 | 0.007054 | 278 |
| 0.0072 | 0.007215 | 284 |
| 0.007362 | 0.007376 | 290 |
| 0.007524 | 0.007537 | 296 |

Fig.9.11.

| | | |
|---|---|---|
| 0.007686 | 0.007699 | 302 |
| 0.007849 | 0.007861 | 308 |
| 0.008012 | 0.008024 | 314 |
| 0.008175 | 0.008186 | 320 |
| 0.008338 | 0.008349 | 326 |
| 0.008502 | 0.008512 | 332 |
| 0.008666 | 0.008676 | 338 |
| 0.00883 | 0.00884 | 344 |
| 0.008995 | 0.009004 | 350 |
| 0.00916 | 0.009168 | 356 |
| 0.009325 | 0.009333 | 362 |
| 0.00949 | 0.009497 | 368 |
| 0.009656 | 0.009663 | 374 |
| 0.009822 | 0.009828 | 380 |
| 0.009988 | 0.009994 | 386 |
| 0.0101555 | 0.01016 | 392 |
| 0.010321 | 0.010326 | 398 |
| 0.010488 | 0.010493 | 404 |
| 0.010656 | 0.010659 | 410 |
| 0.010824 | 0.010827 | 416 |
| 0.010992 | 0.010994 | 422 |
| 0.01116 | 0.011162 | 428 |
| 0.011329 | 0.01133 | 434 |
| 0.011497 | 0.011498 | 440 |
| 0.011667 | 0.011667 | 446 |
| 0.011836 | 0.011836 | 452 |
| 0.012005 | 0.012005 | 458 |
| 0.012174 | 0.012175 | 464 |
| 0.012343 | 0.012345 | 470 |
| 0.012513 | 0.012515 | 476 |
| 0.012683 | 0.012685 | 482 |
| 0.012853 | 0.012856 | 488 |
| 0.013024 | 0.013027 | 494 |
| 0.013195 | 0.013199 | 500 |
| 0.013366 | 0.013371 | 506 |
| 0.013537 | 0.013543 | 512 |

Fig.9.12.

| | | |
|---|---|---|
| 0.013709 | 0.013715 | 518 |
| 0.013882 | 0.013888 | 524 |
| 0.014054 | 0.014061 | 530 |
| 0.014227 | 0.014235 | 536 |
| 0.0144 | 0.014408 | 542 |
| 0.014574 | 0.014582 | 548 |
| 0.014748 | 0.014757 | 554 |
| 0.014922 | 0.014932 | 560 |
| 0.015096 | 0.015107 | 566 |
| 0.015271 | 0.015282 | 572 |
| 0.015447 | 0.015458 | 578 |
| 0.015622 | 0.015634 | 584 |
| 0.015798 | 0.015811 | 590 |
| 0.015974 | 0.015987 | 596 |
| 0.016151 | 0.016165 | 602 |
| 0.016328 | 0.016342 | 608 |
| 0.016505 | 0.01652 | 614 |
| 0.016683 | 0.016698 | 620 |
| 0.016861 | 0.016877 | 626 |
| 0.01704 | 0.017056 | 632 |
| 0.017218 | 0.017235 | 638 |
| 0.017398 | 0.017415 | 644 |
| 0.017577 | 0.017595 | 650 |
| 0.017757 | 0.017775 | 656 |
| 0.017937 | 0.017956 | 662 |
| 0.018118 | 0.018137 | 668 |
| 0.018299 | 0.018319 | 674 |
| 0.01848 | 0.018501 | 680 |
| 0.018662 | 0.018683 | 686 |
| 0.018844 | 0.018866 | 692 |
| 0.019027 | 0.019049 | 698 |
| 0.01921 | 0.019233 | 704 |
| 0.019393 | 0.019416 | 710 |
| 0.019577 | 0.019601 | 716 |
| 0.019761 | 0.019785 | 722 |
| 0.020007 | 0.020032 | 730 |

Fig.9.13.

| | | |
|---|---|---|
| 0.020131 | 0.020156 | 734 |
| 0.020316 | 0.020342 | 740 |
| 0.020502 | 0.020528 | 746 |
| 0.020688 | 0.020715 | 752 |
| 0.020875 | 0.020902 | 758 |
| 0.021062 | 0.021089 | 764 |
| 0.021249 | 0.021277 | 770 |
| 0.021437 | 0.021466 | 776 |
| 0.021625 | 0.021655 | 782 |
| 0.021814 | 0.021844 | 788 |
| 0.022003 | 0.022033 | 794 |
| 0.022192 | 0.022224 | 800 |
| 0.022382 | 0.022414 | 806 |
| 0.022573 | 0.022605 | 812 |
| 0.022764 | 0.022796 | 818 |
| 0.022955 | 0.022988 | 824 |
| 0.023147 | 0.023181 | 830 |
| 0.023339 | 0.023373 | 836 |
| 0.023532 | 0.023567 | 842 |
| 0.023725 | 0.02376 | 848 |
| 0.023918 | 0.023954 | 854 |
| 0.024113 | 0.024149 | 860 |
| 0.024307 | 0.024344 | 866 |
| 0.024502 | 0.02454 | 872 |
| 0.024698 | 0.024736 | 878 |
| 0.024893 | 0.024932 | 884 |
| 0.02509 | 0.025129 | 890 |
| 0.025287 | 0.025326 | 896 |
| 0.025484 | 0.025524 | 902 |
| 0.025682 | 0.025723 | 908 |
| 0.025881 | 0.025922 | 914 |
| 0.026079 | 0.026121 | 920 |
| 0.026279 | 0.026321 | 926 |
| 0.026479 | 0.026522 | 932 |
| 0.026679 | 0.026723 | 938 |
| 0.02688 | 0.026924 | 944 |

Fig.9.14.

| | | | |
|---|---|---|---|
| 0.0270082 | 0.027126 | 950 | |
| 0.027284 | 0.027329 | 956 | |
| 0.027486 | 0.027532 | 962 | |
| 0.027689 | 0.027735 | 968 | |
| 0.027893 | 0.027939 | 974 | |
| 0.028097 | 0.028144 | 980 | |
| 0.028302 | 0.028349 | 986 | |
| 0.028507 | 0.028555 | 992 | |
| 0.028713 | 0.028761 | 998 | |
| 0.028919 | 0.028968 | 1004 | |
| 0.029126 | 0.029176 | 1010 | |
| 0.029333 | 0.029384 | 1016 | |
| 0.029541 | 0.029592 | 1022 | |
| 0.029750 | 0.029801 | 1028 | |
| 0.029959 | 0.030011 | 1034 | |
| 0.030169 | 0.030221 | 1040 | |
| 0.030379 | 0.030432 | 1046 | |
| 0.030590 | 0.030644 | 1052 | |
| 0.030802 | 0.030856 | 1058 | |
| 0.031014 | 0.031069 | 1064 | |
| 0.031227 | 0.031282 | 1070 | |
| 0.031440 | 0.031496 | 1076 | |
| 0.031654 | 0.03171 | 1082 | |
| 0.031869 | 0.031926 | 1088 | |
| 0.032084 | 0.032141 | 1094 | |
| 0.03230 | 0.032358 | 1100 | |

TIN = 600 K

| FAR | FARA | TRISE |
|---|---|---|
| 0.005086 | 0.005099 | 200 |

Fig.9.15.

| | | |
|---|---|---|
| 0.005247 | 0.005526 | 206 |
| 0.005409 | 0.005421 | 212 |
| 0.005571 | 0.005583 | 218 |
| 0.005734 | 0.005745 | 224 |
| 0.005897 | 0.005907 | 230 |
| 0.00606 | 0.00607 | 236 |
| 0.006223 | 0.006232 | 242 |
| 0.006386 | 0.006395 | 248 |
| 0.00655 | 0.006559 | 254 |
| 0.006714 | 0.006722 | 260 |
| 0.006879 | 0.006886 | 266 |
| 0.007043 | 0.00705 | 272 |
| 0.007208 | 0.007214 | 278 |
| 0.007373 | 0.007379 | 284 |
| 0.007539 | 0.007544 | 290 |
| 0.007704 | 0.007709 | 296 |
| 0.007871 | 0.007875 | 302 |
| 0.008037 | 0.008041 | 308 |
| 0.008204 | 0.008207 | 314 |
| 0.00837 | 0.008373 | 320 |
| 0.008538 | 0.008540 | 326 |
| 0.008705 | 0.008707 | 332 |
| 0.008873 | 0.008874 | 338 |
| 0.009041 | 0.009042 | 344 |
| 0.009209 | 0.009209 | 350 |
| 0.009377 | 0.009378 | 356 |
| 0.009545 | 0.009546 | 362 |
| 0.009713 | 0.009715 | 368 |
| 0.009882 | 0.009884 | 374 |
| 0.010051 | 0.010053 | 380 |
| 0.01022 | 0.010223 | 386 |
| 0.010389 | 0.010393 | 392 |
| 0.010559 | 0.010563 | 398 |
| 0.010729 | 0.010734 | 404 |
| 0.010899 | 0.010905 | 410 |
| 0.01107 | 0.011076 | 416 |

Fig.9.16.

| | | |
|---|---|---|
| 0.011241 | 0.011248 | 422 |
| 0.011413 | 0.01142 | 428 |
| 0.011584 | 0.011592 | 434 |
| 0.011756 | 0.011764 | 440 |
| 0.011929 | 0.011937 | 446 |
| 0.012101 | 0.01211 | 452 |
| 0.012274 | 0.012284 | 458 |
| 0.012448 | 0.012458 | 464 |
| 0.012621 | 0.012632 | 470 |
| 0.012795 | 0.012807 | 476 |
| 0.012969 | 0.012981 | 482 |
| 0.013144 | 0.013157 | 488 |
| 0.013319 | 0.013332 | 494 |
| 0.013495 | 0.013508 | 500 |
| 0.013671 | 0.013684 | 506 |
| 0.013846 | 0.013861 | 512 |
| 0.014023 | 0.014038 | 518 |
| 0.0142 | 0.014215 | 524 |
| 0.014377 | 0.014393 | 530 |
| 0.014554 | 0.014571 | 536 |
| 0.014732 | 0.014749 | 542 |
| 0.014911 | 0.014928 | 548 |
| 0.015089 | 0.015107 | 554 |
| 0.015268 | 0.015286 | 560 |
| 0.015447 | 0.015466 | 566 |
| 0.015627 | 0.015646 | 572 |
| 0.015807 | 0.015827 | 578 |
| 0.015987 | 0.016008 | 584 |
| 0.016168 | 0.016189 | 590 |
| 0.016349 | 0.016371 | 596 |
| 0.01653 | 0.016553 | 602 |
| 0.016712 | 0.016735 | 608 |
| 0.016895 | 0.016918 | 614 |
| 0.017077 | 0.017101 | 620 |
| 0.01726 | 0.017285 | 626 |
| 0.017444 | 0.017469 | 632 |

Fig.9.17.

| | | |
|---|---|---|
| 0.017628 | 0.017653 | 638 |
| 0.017812 | 0.017838 | 644 |
| 0.017997 | 0.018023 | 650 |
| 0.018182 | 0.018209 | 656 |
| 0.018367 | 0.018395 | 662 |
| 0.018553 | 0.018581 | 668 |
| 0.018739 | 0.018768 | 674 |
| 0.018926 | 0.018955 | 680 |
| 0.019113 | 0.019143 | 686 |
| 0.019301 | 0.019331 | 692 |
| 0.019489 | 0.019520 | 698 |
| 0.019677 | 0.019709 | 704 |
| 0.019866 | 0.019898 | 710 |
| 0.020002 | 0.020034 | 714.3 |
| 0.020245 | 0.020278 | 722 |
| 0.020435 | 0.020469 | 728 |
| 0.020626 | 0.020660 | 734 |
| 0.020817 | 0.020851 | 740 |
| 0.021008 | 0.021043 | 746 |
| 0.0212 | 0.021236 | 752 |
| 0.021392 | 0.021429 | 758 |
| 0.021585 | 0.021622 | 764 |
| 0.021778 | 0.021816 | 770 |
| 0.021972 | 0.022010 | 776 |
| 0.022166 | 0.022205 | 782 |
| 0.022361 | 0.0224 | 788 |
| 0.022556 | 0.022596 | 794 |
| 0.022752 | 0.022792 | 800 |
| 0.022948 | 0.022988 | 806 |
| 0.023144 | 0.023186 | 812 |
| 0.023342 | 0.023383 | 818 |
| 0.023539 | 0.023581 | 824 |
| 0.023737 | 0.02378 | 830 |
| 0.023936 | 0.023979 | 836 |
| 0.024135 | 0.024179 | 842 |
| 0.024334 | 0.024379 | 848 |

Fig.9.18.

| | | | |
|---|---|---|---|
| 0.024534 | 0.024579 | 854 | |
| 0.024735 | 0.02478 | 860 | |
| 0.024936 | 0.024982 | 866 | |
| 0.025138 | 0.025184 | 872 | |
| 0.025334 | 0.025387 | 878 | |
| 0.025543 | 0.02559 | 884 | |
| 0.025746 | 0.025794 | 890 | |
| 0.025950 | 0.025998 | 896 | |
| 0.026154 | 0.026203 | 902 | |
| 0.026359 | 0.026408 | 908 | |
| 0.026564 | 0.026614 | 914 | |
| 0.02677 | 0.026821 | 920 | |
| 0.026976 | 0.027028 | 926 | |
| 0.027184 | 0.027235 | 932 | |
| 0.027391 | 0.027443 | 938 | |
| 0.027599 | 0.027652 | 944 | |
| 0.027808 | 0.027862 | 950 | |
| 0.028018 | 0.028071 | 956 | |
| 0.028228 | 0.028282 | 962 | |
| 0.028438 | 0.028493 | 968 | |
| 0.028649 | 0.028705 | 974 | |
| 0.028861 | 0.028917 | 980 | |
| 0.029073 | 0.02913 | 986 | |
| 0.029286 | 0.029343 | 992 | |
| 0.0295 | 0.029558 | 998 | |
| 0.029714 | 0.029772 | 1004 | |
| 0.029929 | 0.029988 | 1010 | |
| 0.030144 | 0.030204 | 1016 | |
| 0.030361 | 0.03042 | 1022 | |
| 0.030577 | 0.030638 | 1028 | |
| 0.030795 | 0.030856 | 1034 | |
| 0.031013 | 0.031074 | 1040 | |
| 0.031232 | 0.031294 | 1046 | |
| 0.031451 | 0.031513 | 1052 | |
| 0.031671 | 0.031734 | 1058 | |
| 0.031892 | 0.031955 | 1064 | |

Fig.9.19.

| FAR | FARA | TRISE | | | | | |
|---|---|---|---|---|---|---|---|
| 0.032113 | 0.032177 | 1070 | | | | | |
| 0.032336 | 0.0324 | 1076 | | | | | |
| 0.032558 | 0.032624 | 1082 | | | | | |
| 0.032782 | 0.032848 | 1088 | | | | | |
| 0.033006 | 0.033073 | 1094 | | | | | |
| 0.033231 | 0.033298 | 1100 | | | | | |

TIN = 700 K

| FAR | FARA | TRISE |
|---|---|---|
| 0.005215 | 0.005219 | 200 |
| 0.00538 | 0.005384 | 206 |
| 0.005545 | 0.005549 | 212 |
| 0.005711 | 0.005714 | 218 |
| 0.005877 | 0.00588 | 224 |
| 0.006044 | 0.006045 | 230 |
| 0.00621 | 0.006211 | 236 |

Fig.9.20.

| | | |
|---|---|---|
| 0.006377 | 0.006378 | 242 |
| 0.006544 | 0.006545 | 248 |
| 0.006711 | 0.006712 | 254 |
| 0.006878 | 0.006879 | 260 |
| 0.007045 | 0.007046 | 266 |
| 0.007212 | 0.007214 | 272 |
| 0.00738  | 0.007382 | 278 |
| 0.007548 | 0.007551 | 284 |
| 0.007716 | 0.00772  | 290 |
| 0.007885 | 0.007889 | 296 |
| 0.008054 | 0.008058 | 302 |
| 0.008223 | 0.008228 | 308 |
| 0.008392 | 0.008398 | 314 |
| 0.008562 | 0.008568 | 320 |

Fig.9.21.

| | | |
|---|---|---|
| 0.008732 | 0.008739 | 326 |
| 0.008903 | 0.00891 | 332 |
| 0.009073 | 0.009081 | 338 |
| 0.009244 | 0.009253 | 344 |
| 0.009416 | 0.009425 | 350 |
| 0.009587 | 0.009597 | 356 |
| 0.009759 | 0.009769 | 362 |
| 0.009932 | 0.009942 | 368 |
| 0.010104 | 0.010116 | 374 |
| 0.010278 | 0.010289 | 380 |
| 0.010451 | 0.010463 | 386 |
| 0.010625 | 0.010637 | 392 |
| 0.010799 | 0.010812 | 398 |
| 0.010973 | 0.010987 | 404 |
| 0.011148 | 0.011162 | 410 |
| 0.011323 | 0.011337 | 416 |
| 0.011498 | 0.011513 | 422 |
| 0.011674 | 0.01169 | 428 |
| 0.01185 | 0.011866 | 434 |
| 0.012026 | 0.012043 | 440 |
| 0.012203 | 0.01222 | 446 |
| 0.01238 | 0.012398 | 452 |
| 0.012558 | 0.012576 | 458 |
| 0.012735 | 0.012754 | 464 |
| 0.012914 | 0.012933 | 470 |
| 0.013092 | 0.013112 | 476 |
| 0.013271 | 0.013292 | 482 |
| 0.01345 | 0.013472 | 488 |
| 0.01363 | 0.013652 | 494 |
| 0.01381 | 0.013832 | 500 |
| 0.013991 | 0.014013 | 506 |
| 0.014171 | 0.014195 | 512 |
| 0.014352 | 0.014376 | 518 |
| 0.014534 | 0.014558 | 524 |
| 0.014716 | 0.014741 | 530 |
| 0.014898 | 0.014924 | 536 |

Fig.9.22.

| | | |
|---|---|---|
| 0.015081 | 0.015107 | 542 |
| 0.015264 | 0.015291 | 548 |
| 0.015448 | 0.015475 | 554 |
| 0.015631 | 0.015659 | 560 |
| 0.015816 | 0.015844 | 566 |
| 0.016 | 0.016029 | 572 |
| 0.016186 | 0.016215 | 578 |
| 0.016371 | 0.016401 | 584 |
| 0.016557 | 0.016587 | 590 |
| 0.016743 | 0.016774 | 596 |
| 0.016931 | 0.016961 | 602 |
| 0.017117 | 0.017149 | 608 |
| 0.017305 | 0.017337 | 614 |
| 0.017493 | 0.017526 | 620 |
| 0.017681 | 0.017715 | 626 |
| 0.01787 | 0.017904 | 632 |
| 0.018059 | 0.018094 | 638 |
| 0.018249 | 0.018284 | 644 |
| 0.018439 | 0.018475 | 650 |
| 0.018631 | 0.018666 | 656 |
| 0.018821 | 0.018857 | 662 |
| 0.019012 | 0.019049 | 668 |
| 0.019204 | 0.019242 | 674 |
| 0.019396 | 0.019435 | 680 |
| 0.019589 | 0.019628 | 686 |
| 0.019783 | 0.019822 | 692 |
| 0.019999 | 0.020039 | 698.7 |
| 0.020171 | 0.020211 | 704 |
| 0.020365 | 0.020406 | 710 |
| 0.020561 | 0.020602 | 716 |
| 0.020756 | 0.020798 | 722 |
| 0.020952 | 0.020995 | 728 |
| 0.021149 | 0.021192 | 734 |
| 0.021346 | 0.02139 | 740 |
| 0.021544 | 0.021588 | 746 |
| 0.021742 | 0.021786 | 752 |

Fig. 9.23.

| | | |
|---|---|---|
| 0.02194 | 0.021985 | 758 |
| 0.022139 | 0.022185 | 764 |
| 0.022339 | 0.022385 | 770 |
| 0.022539 | 0.022586 | 776 |
| 0.02274 | 0.022787 | 782 |
| 0.022941 | 0.022989 | 788 |
| 0.023142 | 0.023191 | 794 |
| 0.023345 | 0.023393 | 800 |
| 0.023547 | 0.023597 | 806 |
| 0.023751 | 0.0238 | 812 |
| 0.023954 | 0.024005 | 818 |
| 0.024159 | 0.02421 | 824 |
| 0.024363 | 0.024415 | 830 |
| 0.024569 | 0.024621 | 836 |
| 0.024775 | 0.024827 | 842 |
| 0.024981 | 0.025035 | 848 |
| 0.025188 | 0.025242 | 854 |
| 0.025396 | 0.02545 | 860 |
| 0.025604 | 0.025659 | 866 |
| 0.025813 | 0.025869 | 872 |
| 0.026023 | 0.026078 | 878 |
| 0.026233 | 0.026289 | 884 |
| 0.026443 | 0.0265 | 890 |
| 0.026654 | 0.026712 | 896 |
| 0.026866 | 0.026924 | 902 |
| 0.027079 | 0.027137 | 908 |
| 0.027292 | 0.027351 | 914 |
| 0.027505 | 0.027565 | 920 |
| 0.027719 | 0.02778 | 926 |
| 0.027934 | 0.027995 | 932 |
| 0.02815 | 0.028211 | 938 |
| 0.028366 | 0.028428 | 944 |
| 0.028583 | 0.028645 | 950 |
| 0.0288 | 0.028863 | 956 |
| 0.029018 | 0.029082 | 962 |
| 0.029237 | 0.029301 | 968 |

Fig.9.24.

| FAR | FARA | TRISE |
|---|---|---|
| 0.029457 | 0.029521 | 974 |
| 0.029677 | 0.029742 | 980 |
| 0.029898 | 0.029963 | 986 |
| 0.030119 | 0.030185 | 992 |
| 0.030341 | 0.030408 | 998 |
| 0.030564 | 0.030631 | 1004 |
| 0.030788 | 0.030855 | 1010 |
| 0.031012 | 0.031108 | 1016 |
| 0.031237 | 0.031306 | 1022 |
| 0.031463 | 0.031532 | 1028 |
| 0.03169 | 0.031759 | 1034 |
| 0.031917 | 0.031987 | 1040 |
| 0.032145 | 0.032216 | 1046 |
| 0.032374 | 0.032445 | 1052 |
| 0.032603 | 0.032675 | 1058 |
| 0.032834 | 0.032906 | 1064 |
| 0.033065 | 0.033138 | 1070 |
| 0.033297 | 0.033337 | 1076 |
| 0.033529 | 0.033603 | 1082 |
| 0.033763 | 0.033837 | 1088 |
| 0.033997 | 0.034072 | 1094 |
| 0.034232 | 0.034308 | 1100 |

TIN = 800 K

| FAR | FARA | TRISE |
|---|---|---|
| 0.00534 | 0.005345 | 200 |
| 0.005508 | 0.005513 | 206 |
| 0.005676 | 0.005682 | 212 |
| 0.005845 | 0.005851 | 218 |
| 0.006013 | 0.00602 | 224 |

Fig.9.25.

| | | |
|---|---|---|
| 0.006183 | 0.00619 | 230 |
| 0.006352 | 0.00636 | 236 |
| 0.006522 | 0.00653 | 242 |
| 0.006692 | 0.0067 | 248 |
| 0.006862 | 0.006871 | 254 |
| 0.007033 | 0.007043 | 260 |
| 0.007204 | 0.007214 | 266 |
| 0.007375 | 0.007386 | 272 |
| 0.007547 | 0.007558 | 278 |
| 0.007719 | 0.007731 | 284 |
| 0.007891 | 0.007903 | 290 |
| 0.008064 | 0.008077 | 296 |
| 0.008237 | 0.00825 | 302 |
| 0.008411 | 0.008424 | 308 |
| 0.008583 | 0.008598 | 314 |
| 0.008757 | 0.008772 | 320 |
| 0.008932 | 0.008947 | 326 |
| 0.009106 | 0.009122 | 332 |
| 0.009281 | 0.009298 | 338 |
| 0.009457 | 0.009474 | 344 |
| 0.009632 | 0.00965 | 350 |
| 0.009808 | 0.009826 | 356 |
| 0.009985 | 0.010003 | 362 |
| 0.010161 | 0.010181 | 368 |
| 0.010338 | 0.010358 | 374 |
| 0.010516 | 0.010536 | 380 |
| 0.010693 | 0.010714 | 386 |
| 0.010872 | 0.010893 | 392 |
| 0.01105 | 0.011072 | 398 |
| 0.011229 | 0.011252 | 404 |
| 0.011408 | 0.011431 | 410 |
| 0.011588 | 0.011611 | 416 |
| 0.011768 | 0.011792 | 422 |
| 0.011948 | 0.011973 | 428 |
| 0.012129 | 0.012154 | 434 |
| 0.01231 | 0.012336 | 440 |

Fig.9.26.

| | |
|---|---|
| 0.0124491 | |
| 0.0126713 | |
| 0.012855 | 0.012518 | 446 |
| 0.013038 | 0.0127 | 452 |
| 0.013221 | 0.012883 | 458 |
| 0.013404 | 0.013066 | 464 |
| 0.013588 | 0.013249 | 470 |
| 0.013772 | 0.013433 | 476 |
| 0.013957 | 0.013618 | 482 |
| 0.014142 | 0.013803 | 488 |
| 0.014327 | 0.013988 | 494 |
| 0.014513 | 0.014173 | 500 |
| 0.0147 | 0.014359 | 506 |
| 0.014886 | 0.014545 | 512 |
| 0.015073 | 0.014732 | 518 |
| 0.015261 | 0.014919 | 524 |
| 0.015449 | 0.015107 | 530 |
| 0.015637 | 0.015295 | 536 |
| 0.015826 | 0.015483 | 542 |
| 0.016015 | 0.015672 | 548 |
| 0.016205 | 0.015862 | 554 |
| 0.016395 | 0.016051 | 560 |
| 0.016585 | 0.016242 | 566 |
| 0.016776 | 0.016432 | 572 |
| 0.016967 | 0.016623 | 578 |
| 0.017159 | 0.016815 | 584 |
| 0.017352 | 0.017007 | 590 |
| 0.017544 | 0.017199 | 596 |
| 0.017738 | 0.017392 | 602 |
| 0.017931 | 0.017585 | 608 |
| 0.018125 | 0.017779 | 614 |
| 0.018320 | 0.017973 | 620 |
| 0.018515 | 0.018168 | 626 |
| 0.018711 | 0.018363 | 632 |
| 0.018907 | 0.018558 | 638 |
| 0.019103 | 0.018754 | 644 |
| | 0.018951 | 650 |
| | 0.019148 | 656 |

Fig.9.27.

| | | |
|---|---|---|
| 0.0193 | 0.019346 | 662 |
| 0.019498 | 0.019544 | 668 |
| 0.019696 | 0.019742 | 674 |
| 0.019894 | 0.019941 | 680 |
| 0.02 | 0.020047 | 683.2 |
| 0.020293 | 0.020341 | 692 |
| 0.020492 | 0.020541 | 698 |
| 0.020693 | 0.020742 | 704 |
| 0.020894 | 0.020944 | 710 |
| 0.021096 | 0.021146 | 716 |
| 0.021298 | 0.021348 | 722 |
| 0.0215 | 0.021552 | 728 |
| 0.021703 | 0.021755 | 734 |
| 0.021907 | 0.021959 | 740 |
| 0.022111 | 0.022164 | 746 |
| 0.022316 | 0.02237 | 752 |
| 0.022521 | 0.022575 | 758 |
| 0.022727 | 0.022782 | 764 |
| 0.022934 | 0.022989 | 770 |
| 0.023141 | 0.023196 | 776 |
| 0.023348 | 0.023404 | 782 |
| 0.023556 | 0.023613 | 788 |
| 0.023765 | 0.023822 | 794 |
| 0.023974 | 0.024032 | 800 |
| 0.024184 | 0.024242 | 806 |
| 0.024395 | 0.024453 | 812 |
| 0.024606 | 0.024665 | 818 |
| 0.024817 | 0.024877 | 824 |
| 0.02503 | 0.02509 | 830 |
| 0.025242 | 0.025303 | 836 |
| 0.025456 | 0.025517 | 842 |
| 0.02567 | 0.025732 | 848 |
| 0.025885 | 0.025947 | 854 |
| 0.0261 | 0.026163 | 860 |
| 0.026316 | 0.026638 | 866 |
| 0.026533 | 0.026597 | 872 |

Fig.9.28.

| | | |
|---|---|---|
| 0.02675 | 0.026815 | 878 |
| 0.026968 | 0.027033 | 884 |
| 0.027187 | 0.027253 | 890 |
| 0.027406 | 0.027473 | 896 |
| 0.027626 | 0.027693 | 902 |
| 0.027847 | 0.027914 | 908 |
| 0.028068 | 0.028136 | 914 |
| 0.02829 | 0.028359 | 920 |
| 0.028513 | 0.028582 | 926 |
| 0.028737 | 0.028806 | 932 |
| 0.028961 | 0.029031 | 938 |
| 0.029186 | 0.029256 | 944 |
| 0.029411 | 0.029482 | 950 |
| 0.029638 | 0.029709 | 956 |
| 0.029865 | 0.029937 | 962 |
| 0.030093 | 0.030165 | 968 |
| 0.030321 | 0.030395 | 974 |
| 0.030551 | 0.030624 | 980 |
| 0.030781 | 0.030855 | 986 |
| 0.031012 | 0.031087 | 992 |
| 0.031244 | 0.031319 | 998 |
| 0.031476 | 0.031552 | 1004 |
| 0.031709 | 0.031786 | 1010 |
| 0.031944 | 0.032021 | 1016 |
| 0.032179 | 0.032256 | 1022 |
| 0.032414 | 0.032492 | 1028 |
| 0.032651 | 0.032729 | 1034 |
| 0.032889 | 0.032968 | 1040 |
| 0.033127 | 0.033207 | 1046 |
| 0.033366 | 0.033446 | 1052 |
| 0.033606 | 0.033687 | 1058 |
| 0.033847 | 0.033929 | 1064 |
| 0.034089 | 0.034171 | 1070 |
| 0.034332 | 0.034414 | 1076 |
| 0.034576 | 0.034659 | 1082 |
| 0.03482 | 0.034904 | 1088 |

Fig.9.29.

| FAR | FARA | TRISE | | | | |
|---|---|---|---|---|---|---|
| | 0.035 | 0.035084 | 1092.4 | | | |
| | 0.035312 | 0.035397 | 1100 | | | |

TIN = 900 K

| FAR | FARA | TRISE |
|---|---|---|
| 0.005462 | 0.005476 | 200 |
| 0.005634 | 0.005648 | 206 |
| 0.005806 | 0.005821 | 212 |
| 0.005979 | 0.005994 | 218 |
| 0.006151 | 0.006167 | 224 |
| 0.006325 | 0.006341 | 230 |
| 0.006498 | 0.006515 | 236 |
| 0.006672 | 0.006689 | 242 |
| 0.006846 | 0.006864 | 248 |
| 0.00702 | 0.007039 | 254 |
| 0.007195 | 0.007214 | 260 |
| 0.00737 | 0.00739 | 266 |
| 0.007546 | 0.007566 | 272 |
| 0.007722 | 0.007742 | 278 |
| 0.007898 | 0.007919 | 284 |
| 0.008074 | 0.008096 | 290 |
| 0.008251 | 0.008273 | 296 |
| 0.008429 | 0.008451 | 302 |
| 0.008606 | 0.008629 | 308 |
| 0.008784 | 0.008808 | 314 |
| 0.008962 | 0.008986 | 320 |
| 0.009141 | 0.009166 | 326 |
| 0.00932 | 0.009345 | 332 |
| 0.0095 | 0.009525 | 338 |
| 0.009679 | 0.009706 | 344 |

Fig.9.30.

| | | | | | | | |
|---|---|---|---|---|---|---|---|
| 0.00986 | 0.009886 | 350 | | | | | |
| 0.01004 | 0.010067 | 356 | | | | | |
| 0.010221 | 0.010249 | 362 | | | | | |
| 0.010402 | 0.010431 | 368 | | | | | |
| 0.010584 | 0.010613 | 374 | | | | | |
| 0.010766 | 0.010795 | 380 | | | | | |
| 0.010948 | 0.010978 | 386 | | | | | |
| 0.011131 | 0.011162 | 392 | | | | | |
| 0.011315 | 0.011346 | 398 | | | | | |
| 0.011498 | 0.01153 | 404 | | | | | |
| 0.011682 | 0.011714 | 410 | | | | | |
| 0.011867 | 0.011899 | 416 | | | | | |
| 0.012051 | 0.012085 | 422 | | | | | |
| 0.012237 | 0.01227 | 428 | | | | | |
| 0.012422 | 0.012456 | 434 | | | | | |
| 0.012608 | 0.012643 | 440 | | | | | |
| 0.012795 | 0.01283 | 446 | | | | | |
| 0.012982 | 0.013017 | 452 | | | | | |
| 0.013169 | 0.013205 | 458 | | | | | |
| 0.013357 | 0.013393 | 464 | | | | | |
| 0.013545 | 0.013582 | 470 | | | | | |
| 0.013733 | 0.013771 | 476 | | | | | |
| 0.013922 | 0.013961 | 482 | | | | | |
| 0.014112 | 0.014151 | 488 | | | | | |
| 0.014302 | 0.014341 | 494 | | | | | |
| 0.014492 | 0.014532 | 500 | | | | | |
| 0.014683 | 0.014723 | 506 | | | | | |
| 0.014874 | 0.014915 | 512 | | | | | |
| 0.015066 | 0.015107 | 518 | | | | | |
| 0.015258 | 0.0153 | 524 | | | | | |
| 0.01545 | 0.015493 | 530 | | | | | |
| 0.015643 | 0.015686 | 536 | | | | | |
| 0.015837 | 0.01588 | 542 | | | | | |
| 0.016031 | 0.016075 | 548 | | | | | |
| 0.016225 | 0.01627 | 554 | | | | | |
| 0.01642 | 0.016465 | 560 | | | | | |

Fig.9.31.

| | |
|---|---|
| 0.016615 | 0.016661 | 566 |
| 0.016811 | 0.016857 | 572 |
| 0.017007 | 0.017054 | 578 |
| 0.017204 | 0.017251 | 584 |
| 0.017401 | 0.017449 | 590 |
| 0.017599 | 0.017648 | 596 |
| 0.017797 | 0.017846 | 602 |
| 0.017996 | 0.018046 | 608 |
| 0.018195 | 0.018245 | 614 |
| 0.018395 | 0.018446 | 620 |
| 0.018595 | 0.018646 | 626 |
| 0.018796 | 0.018848 | 632 |
| 0.018997 | 0.019050 | 638 |
| 0.019199 | 0.019252 | 644 |
| 0.019402 | 0.019455 | 650 |
| 0.019604 | 0.019658 | 656 |
| 0.019808 | 0.019862 | 662 |
| 0.020002 | 0.020057 | 667.7 |
| 0.020216 | 0.020272 | 674 |
| 0.020421 | 0.020477 | 680 |
| 0.020627 | 0.020684 | 686 |
| 0.020833 | 0.020890 | 692 |
| 0.021040 | 0.021097 | 698 |
| 0.021247 | 0.021305 | 704 |
| 0.021455 | 0.021514 | 710 |
| 0.021663 | 0.021723 | 716 |
| 0.021872 | 0.021932 | 722 |
| 0.022082 | 0.022142 | 728 |
| 0.022292 | 0.022353 | 734 |
| 0.022503 | 0.022564 | 740 |
| 0.022714 | 0.022776 | 746 |
| 0.022926 | 0.022989 | 752 |
| 0.023139 | 0.023202 | 758 |
| 0.023352 | 0.023416 | 764 |
| 0.023566 | 0.023630 | 770 |
| 0.023781 | 0.023845 | 776 |

Fig.9.32.

| | |
|---|---|
| 0.023996 | |
| 0.024211 | 0.024061 |
| 0.024428 | 0.024277 |
| 0.024645 | 0.024494 |
| 0.024863 | 0.024712 |
| 0.025081 | 0.024493 |
| 0.0253 | 0.025149 |
| 0.025552 | 0.025368 |
| 0.025574 | 0.025588 |
| 0.025961 | 0.025809 |
| 0.026183 | 0.026031 |
| 0.026405 | 0.026253 |
| 0.026628 | 0.026476 |
| 0.026852 | 0.0267 |
| 0.027077 | 0.026924 |
| 0.027302 | 0.027149 |
| 0.027528 | 0.027375 |
| 0.027755 | 0.027602 |
| 0.027982 | 0.027829 |
| 0.028211 | 0.028057 |
| 0.02844 | 0.028286 |
| 0.02867 | 0.028515 |
| 0.0289 | 0.028746 |
| 0.029132 | 0.028977 |
| 0.029364 | 0.029209 |
| 0.029597 | 0.029442 |
| 0.029831 | 0.029675 |
| 0.029983 | 0.029909 |
| 0.030065 | 0.030145 |
| 0.030301 | 0.030381 |
| 0.030537 | 0.030617 |
| 0.030774 | 0.030855 |
| 0.031012 | 0.031093 |
| 0.031251 | 0.031333 |
| 0.03149 | 0.031573 |
| 0.031731 | 0.031814 |
| 0.031972 | 0.032056 |

| | |
|---|---|
| | 782 |
| | 788 |
| | 794 |
| | 800 |
| | 806 |
| | 812 |
| | 818 |
| | 824 |
| | 830 |
| | 836 |
| | 842 |
| | 848 |
| | 854 |
| | 860 |
| | 866 |
| | 872 |
| | 878 |
| | 884 |
| | 890 |
| | 896 |
| | 902 |
| | 908 |
| | 914 |
| | 920 |
| | 926 |
| | 932 |
| | 938 |
| | 944 |
| | 950 |
| | 956 |
| | 962 |
| | 968 |
| | 974 |
| | 980 |
| | 986 |
| | 992 |

Fig.9.33.

| FAR | FARA | | | | | | | | | | | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 0.032215 | 0.032299 | 998 | | | | | | | | | | | | | | | | | | | | | | | | | | | | | | | | | | | | | | | | | | | | | | | | | | | | | | |
| 0.032458 | 0.032543 | 1004 | | | | | | | | | | | | | | | | | | | | | | | | | | | | | | | | | | | | | | | | | | | | | | | | | | | | | | |
| 0.032702 | 0.032788 | 1010 | | | | | | | | | | | | | | | | | | | | | | | | | | | | | | | | | | | | | | | | | | | | | | | | | | | | | | |
| 0.032948 | 0.033033 | 1016 | | | | | | | | | | | | | | | | | | | | | | | | | | | | | | | | | | | | | | | | | | | | | | | | | | | | | | |
| 0.033194 | 0.03328 | 1022 | | | | | | | | | | | | | | | | | | | | | | | | | | | | | | | | | | | | | | | | | | | | | | | | | | | | | | |
| 0.033441 | 0.033528 | 1028 | | | | | | | | | | | | | | | | | | | | | | | | | | | | | | | | | | | | | | | | | | | | | | | | | | | | | | |
| 0.033689 | 0.033776 | 1034 | | | | | | | | | | | | | | | | | | | | | | | | | | | | | | | | | | | | | | | | | | | | | | | | | | | | | | |
| 0.033938 | 0.034026 | 1040 | | | | | | | | | | | | | | | | | | | | | | | | | | | | | | | | | | | | | | | | | | | | | | | | | | | | | | |
| 0.034188 | 0.034276 | 1046 | | | | | | | | | | | | | | | | | | | | | | | | | | | | | | | | | | | | | | | | | | | | | | | | | | | | | | |
| 0.034439 | 0.034528 | 1052 | | | | | | | | | | | | | | | | | | | | | | | | | | | | | | | | | | | | | | | | | | | | | | | | | | | | | | |
| 0.034691 | 0.03478 | 1058 | | | | | | | | | | | | | | | | | | | | | | | | | | | | | | | | | | | | | | | | | | | | | | | | | | | | | | |
| 0.034999 | 0.035089 | 1065.3 | | | | | | | | | | | | | | | | | | | | | | | | | | | | | | | | | | | | | | | | | | | | | | | | | | | | | | |
| 0.035198 | 0.035288 | 1070 | | | | | | | | | | | | | | | | | | | | | | | | | | | | | | | | | | | | | | | | | | | | | | | | | | | | | | |
| 0.035453 | 0.035544 | 1076 | | | | | | | | | | | | | | | | | | | | | | | | | | | | | | | | | | | | | | | | | | | | | | | | | | | | | | |
| 0.035709 | 0.035801 | 1082 | | | | | | | | | | | | | | | | | | | | | | | | | | | | | | | | | | | | | | | | | | | | | | | | | | | | | | |
| 0.035966 | 0.036059 | 1088 | | | | | | | | | | | | | | | | | | | | | | | | | | | | | | | | | | | | | | | | | | | | | | | | | | | | | | |
| 0.036225 | 0.036318 | 1094 | | | | | | | | | | | | | | | | | | | | | | | | | | | | | | | | | | | | | | | | | | | | | | | | | | | | | | |
| 0.036484 | 0.036578 | 1100 | | | | | | | | | | | | | | | | | | | | | | | | | | | | | | | | | | | | | | | | | | | | | | | | | | | | | | |

TIN = 1000 K

| FAR | FARA | TRISE |
|---|---|---|
| 0.005559 | 0.005613 | 200 |
| 0.005766 | 0.005789 | 206 |
| 0.005943 | 0.005966 | 212 |
| 0.006119 | 0.006143 | 218 |
| 0.006296 | 0.006321 | 224 |
| 0.006474 | 0.006499 | 230 |
| 0.006651 | 0.006677 | 236 |
| 0.006829 | 0.006855 | 242 |
| 0.007008 | 0.007034 | 248 |

Fig.9.34.

| | | |
|---|---|---|
| 0.007187 | 0.007214 | 254 |
| 0.007366 | 0.007393 | 260 |
| 0.007545 | 0.007573 | 266 |
| 0.007725 | 0.007754 | 272 |
| 0.007905 | 0.007935 | 278 |
| 0.008086 | 0.008116 | 284 |
| 0.008267 | 0.008297 | 290 |
| 0.008449 | 0.008479 | 296 |
| 0.008631 | 0.008662 | 302 |
| 0.008813 | 0.008844 | 308 |
| 0.008995 | 0.009027 | 314 |
| 0.009178 | 0.009211 | 320 |
| 0.009361 | 0.009395 | 326 |
| 0.009545 | 0.009579 | 332 |
| 0.009729 | 0.009764 | 338 |
| 0.009914 | 0.009949 | 344 |
| 0.010099 | 0.010134 | 350 |
| 0.010284 | 0.010320 | 356 |
| 0.010470 | 0.010506 | 362 |
| 0.010656 | 0.010693 | 368 |
| 0.010843 | 0.010880 | 374 |
| 0.011030 | 0.011068 | 380 |
| 0.011217 | 0.011256 | 386 |
| 0.011405 | 0.011444 | 392 |
| 0.011593 | 0.011633 | 398 |
| 0.011782 | 0.011822 | 404 |
| 0.011971 | 0.012012 | 410 |
| 0.012160 | 0.012202 | 416 |
| 0.012350 | 0.012392 | 422 |
| 0.012541 | 0.012583 | 428 |
| 0.012732 | 0.012775 | 434 |
| 0.012923 | 0.012967 | 440 |
| 0.013115 | 0.013159 | 446 |
| 0.013307 | 0.013352 | 452 |
| 0.013500 | 0.013545 | 458 |
| 0.013693 | 0.013738 | 464 |

Fig.9.35.

| | |
|---|---|
| 0.013886 | 0.013933 | 470 |
| 0.01408 | 0.014127 | 476 |
| 0.014275 | 0.014322 | 482 |
| 0.014471 | 0.014518 | 488 |
| 0.014665 | 0.014714 | 494 |
| 0.014861 | 0.01491 | 500 |
| 0.015058 | 0.015107 | 506 |
| 0.015255 | 0.015305 | 512 |
| 0.015452 | 0.015503 | 518 |
| 0.015565 | 0.015701 | 524 |
| 0.015848 | 0.0159 | 530 |
| 0.016047 | 0.016099 | 536 |
| 0.016247 | 0.016299 | 542 |
| 0.016447 | 0.0165 | 548 |
| 0.016647 | 0.016701 | 554 |
| 0.016848 | 0.016902 | 560 |
| 0.017049 | 0.017104 | 566 |
| 0.017251 | 0.017307 | 572 |
| 0.017454 | 0.01751 | 578 |
| 0.017657 | 0.017713 | 584 |
| 0.017861 | 0.017917 | 590 |
| 0.018065 | 0.018122 | 596 |
| 0.018269 | 0.018327 | 602 |
| 0.018475 | 0.018533 | 608 |
| 0.01868 | 0.018739 | 614 |
| 0.018887 | 0.018946 | 620 |
| 0.019094 | 0.019154 | 626 |
| 0.019301 | 0.019362 | 632 |
| 0.019509 | 0.01957 | 638 |
| 0.019718 | 0.019779 | 644 |
| 0.02 | 0.020063 | 652.1 |
| 0.020137 | 0.020199 | 656 |
| 0.020347 | 0.02041 | 662 |
| 0.020558 | 0.020622 | 668 |
| 0.020769 | 0.020834 | 674 |
| 0.020982 | 0.021046 | 680 |

Fig.9.36.

| | |
|---|---|
| 0.021194 | 0.02126 | 686 |
| 0.021408 | 0.021474 | 692 |
| 0.021622 | 0.021688 | 698 |
| 0.021836 | 0.021903 | 704 |
| 0.022052 | 0.022119 | 710 |
| 0.022268 | 0.022336 | 716 |
| 0.022484 | 0.022553 | 722 |
| 0.022701 | 0.022771 | 728 |
| 0.022919 | 0.022989 | 734 |
| 0.023138 | 0.023208 | 740 |
| 0.023357 | 0.023428 | 746 |
| 0.023577 | 0.023648 | 752 |
| 0.023798 | 0.023869 | 758 |
| 0.024019 | 0.024091 | 764 |
| 0.024241 | 0.024314 | 770 |
| 0.024463 | 0.024537 | 776 |
| 0.024687 | 0.024761 | 782 |
| 0.024911 | 0.024985 | 788 |
| 0.025136 | 0.025211 | 794 |
| 0.025361 | 0.025437 | 800 |
| 0.025587 | 0.025663 | 806 |
| 0.025814 | 0.025891 | 812 |
| 0.026042 | 0.026119 | 818 |
| 0.026271 | 0.026348 | 824 |
| 0.0265 | 0.026578 | 830 |
| 0.026673 | 0.026809 | 836 |
| 0.026961 | 0.02704 | 842 |
| 0.027192 | 0.027272 | 848 |
| 0.027425 | 0.027505 | 854 |
| 0.027658 | 0.027739 | 860 |
| 0.027892 | 0.027973 | 866 |
| 0.028127 | 0.028209 | 872 |
| 0.028362 | 0.028445 | 878 |
| 0.028599 | 0.028682 | 884 |
| 0.028836 | 0.02892 | 890 |
| 0.029075 | 0.029159 | 896 |

Fig.9.37.

| | | |
|---|---|---|
| 0.029314 | 0.029398 | 902 |
| 0.029554 | 0.029639 | 908 |
| 0.029794 | 0.02988 | 914 |
| 0.030036 | 0.030122 | 920 |
| 0.030279 | 0.030366 | 926 |
| 0.030522 | 0.03061 | 932 |
| 0.030767 | 0.030855 | 938 |
| 0.031012 | 0.031101 | 944 |
| 0.031259 | 0.031348 | 950 |
| 0.031506 | 0.031595 | 956 |
| 0.031754 | 0.031844 | 962 |
| 0.032004 | 0.032094 | 968 |
| 0.032254 | 0.032345 | 974 |
| 0.032505 | 0.032597 | 980 |
| 0.032757 | 0.03285 | 986 |
| 0.033011 | 0.033103 | 992 |
| 0.033265 | 0.033358 | 998 |
| 0.033521 | 0.033614 | 1004 |
| 0.033777 | 0.033871 | 1010 |
| 0.034035 | 0.034129 | 1016 |
| 0.034293 | 0.034389 | 1022 |
| 0.034553 | 0.034649 | 1028 |
| 0.034814 | 0.03491 | 1034 |
| 0.035002 | 0.035098 | 1038.3 |
| 0.035339 | 0.035437 | 1046 |
| 0.035604 | 0.035702 | 1052 |
| 0.035869 | 0.035968 | 1058 |
| 0.036136 | 0.036235 | 1064 |
| 0.036404 | 0.036504 | 1070 |
| 0.036673 | 0.036773 | 1076 |
| 0.036944 | 0.037044 | 1082 |
| 0.037215 | 0.037317 | 1088 |
| 0.037488 | 0.03759 | 1094 |
| 0.037763 | 0.037865 | 1100 |

Fig.9.38.

| TIN = 1100 K | | |
|---|---|---|
| FAR | FARA | TRISE |
| 0.005725 | 0.005756 | 200 |
| 0.005905 | 0.005937 | 206 |
| 0.006086 | 0.006118 | 212 |
| 0.006267 | 0.0063 | 218 |
| 0.006449 | 0.006482 | 224 |
| 0.00663 | 0.006664 | 230 |
| 0.006813 | 0.006847 | 236 |
| 0.006995 | 0.007030 | 242 |
| 0.007178 | 0.007213 | 248 |
| 0.007361 | 0.007397 | 254 |
| 0.007545 | 0.007582 | 260 |
| 0.007729 | 0.007766 | 266 |
| 0.007914 | 0.007951 | 272 |
| 0.008099 | 0.008137 | 278 |
| 0.008284 | 0.008323 | 284 |
| 0.00847 | 0.008509 | 290 |
| 0.008656 | 0.008696 | 296 |
| 0.008843 | 0.008883 | 302 |
| 0.00903 | 0.00907 | 308 |
| 0.009217 | 0.009258 | 314 |
| 0.009405 | 0.009447 | 320 |
| 0.009593 | 0.009636 | 326 |
| 0.009782 | 0.009825 | 332 |
| 0.009971 | 0.010014 | 338 |
| 0.010161 | 0.010205 | 344 |
| 0.010351 | 0.010395 | 350 |
| 0.010541 | 0.010586 | 356 |
| 0.010732 | 0.010777 | 362 |
| 0.010923 | 0.010969 | 368 |

Fig.9.39.

| | | | |
|---|---|---|---|
| 0.011115 | 0.011162 | 374 | |
| 0.011307 | 0.011354 | 380 | |
| 0.0115 | 0.011548 | 386 | |
| 0.011693 | 0.011741 | 392 | |
| 0.011887 | 0.011935 | 398 | |
| 0.012081 | 0.01213 | 404 | |
| 0.012275 | 0.012325 | 410 | |
| 0.01247 | 0.012521 | 416 | |
| 0.012666 | 0.012717 | 422 | |
| 0.012862 | 0.012913 | 428 | |
| 0.013058 | 0.01311 | 434 | |
| 0.013255 | 0.013308 | 440 | |
| 0.013453 | 0.013506 | 446 | |
| 0.013651 | 0.013704 | 452 | |
| 0.013849 | 0.013903 | 458 | |
| 0.014048 | 0.014102 | 464 | |
| 0.014247 | 0.014302 | 470 | |
| 0.014447 | 0.014503 | 476 | |
| 0.014648 | 0.014704 | 482 | |
| 0.014849 | 0.014905 | 488 | |
| 0.01505 | 0.015107 | 494 | |
| 0.015252 | 0.01531 | 500 | |
| 0.015455 | 0.015513 | 506 | |
| 0.015658 | 0.015717 | 512 | |
| 0.015861 | 0.015921 | 518 | |
| 0.016065 | 0.016125 | 524 | |
| 0.01627 | 0.016331 | 530 | |
| 0.016475 | 0.016536 | 536 | |
| 0.016681 | 0.016743 | 542 | |
| 0.016887 | 0.016949 | 548 | |
| 0.017094 | 0.017157 | 554 | |
| 0.017302 | 0.017365 | 560 | |
| 0.01751 | 0.017574 | 566 | |
| 0.017718 | 0.017783 | 572 | |
| 0.017928 | 0.017992 | 578 | |
| 0.018137 | 0.018203 | 584 | |

Fig.9.40.

| | | | |
|---|---|---|---|
| 0.018348 | 0.018414 | 590 | |
| 0.018559 | 0.018625 | 596 | |
| 0.01877 | 0.018837 | 602 | |
| 0.018983 | 0.01905 | 608 | |
| 0.019195 | 0.019263 | 614 | |
| 0.019409 | 0.019477 | 620 | |
| 0.019623 | 0.019692 | 626 | |
| 0.019838 | 0.019907 | 632 | |
| 0.019999 | 0.020069 | 636.5 | |
| 0.020269 | 0.020339 | 644 | |
| 0.020485 | 0.020557 | 650 | |
| 0.020703 | 0.020774 | 656 | |
| 0.020921 | 0.020993 | 662 | |
| 0.021139 | 0.021212 | 668 | |
| 0.021358 | 0.021432 | 674 | |
| 0.021578 | 0.021652 | 680 | |
| 0.021799 | 0.021873 | 686 | |
| 0.02202 | 0.022095 | 692 | |
| 0.022242 | 0.022317 | 698 | |
| 0.022465 | 0.022541 | 704 | |
| 0.022688 | 0.022765 | 710 | |
| 0.022912 | 0.022989 | 716 | |
| 0.023137 | 0.023215 | 722 | |
| 0.023363 | 0.023441 | 728 | |
| 0.023589 | 0.023667 | 734 | |
| 0.023816 | 0.023895 | 740 | |
| 0.024044 | 0.024123 | 746 | |
| 0.024272 | 0.024352 | 752 | |
| 0.024501 | 0.024582 | 758 | |
| 0.024732 | 0.024813 | 764 | |
| 0.024962 | 0.025044 | 770 | |
| 0.025194 | 0.025276 | 776 | |
| 0.025426 | 0.025509 | 782 | |
| 0.02566 | 0.025743 | 788 | |
| 0.025894 | 0.025978 | 794 | |
| 0.026129 | 0.026213 | 800 | |

Fig.9.41.

| | | |
|---|---|---|
| 0.026364 | 0.026449 | 806 |
| 0.026601 | 0.026686 | 812 |
| 0.026838 | 0.026924 | 818 |
| 0.027076 | 0.027163 | 824 |
| 0.027316 | 0.027403 | 830 |
| 0.027556 | 0.027643 | 836 |
| 0.027796 | 0.027885 | 842 |
| 0.028038 | 0.028127 | 848 |
| 0.028281 | 0.028371 | 854 |
| 0.028524 | 0.028614 | 860 |
| 0.028769 | 0.028859 | 866 |
| 0.029014 | 0.029105 | 872 |
| 0.029261 | 0.029352 | 878 |
| 0.029508 | 0.0296 | 884 |
| 0.029757 | 0.029849 | 890 |
| 0.030006 | 0.030099 | 896 |
| 0.030256 | 0.030350 | 902 |
| 0.030508 | 0.030602 | 908 |
| 0.030760 | 0.030854 | 914 |
| 0.031013 | 0.031108 | 920 |
| 0.031268 | 0.031363 | 926 |
| 0.031523 | 0.031619 | 932 |
| 0.03178 | 0.031876 | 938 |
| 0.032037 | 0.032135 | 944 |
| 0.032296 | 0.032394 | 950 |
| 0.032556 | 0.032654 | 956 |
| 0.032817 | 0.032916 | 962 |
| 0.033079 | 0.033178 | 968 |
| 0.033342 | 0.033442 | 974 |
| 0.033606 | 0.033707 | 980 |
| 0.033872 | 0.033973 | 986 |
| 0.034139 | 0.03424 | 992 |
| 0.034407 | 0.034509 | 998 |
| 0.034676 | 0.034779 | 1004 |
| 0.035001 | 0.035104 | 1011.2 |
| 0.035218 | 0.035322 | 1016 |

Fig.9.42.

| | | |
|---|---|---|
| 0.035492 | 0.035596 | 1022 |
| 0.035766 | 0.035871 | 1028 |
| 0.036042 | 0.036147 | 1034 |
| 0.036319 | 0.036424 | 1040 |
| 0.036597 | 0.036703 | 1046 |
| 0.036877 | 0.036984 | 1052 |
| 0.037158 | 0.037265 | 1058 |
| 0.037441 | 0.037549 | 1064 |
| 0.037725 | 0.037833 | 1070 |
| 0.03801 | 0.038119 | 1076 |
| 0.038297 | 0.038407 | 1082 |
| 0.038586 | 0.038696 | 1088 |
| 0.038876 | 0.038987 | 1094 |
| 0.039168 | 0.039279 | 1100 |

TIN = 1200 K

| FAR | FARA | TRISE |
|---|---|---|
| 0.005867 | 0.005907 | 200 |
| 0.006052 | 0.006092 | 206 |
| 0.006237 | 0.006278 | 212 |
| 0.006423 | 0.006464 | 218 |
| 0.006609 | 0.006651 | 224 |
| 0.006795 | 0.006838 | 230 |
| 0.006982 | 0.007025 | 236 |
| 0.007169 | 0.007213 | 242 |
| 0.007357 | 0.007401 | 248 |
| 0.007545 | 0.00759 | 254 |
| 0.007734 | 0.007779 | 260 |
| 0.007923 | 0.007969 | 266 |
| 0.008113 | 0.008159 | 272 |

Fig.9.43.

| | | |
|---|---|---|
| 0.008302 | 0.008349 | 278 |
| 0.008493 | 0.008854 | 284 |
| 0.008684 | 0.008732 | 290 |
| 0.008875 | 0.008923 | 296 |
| 0.009066 | 0.009116 | 302 |
| 0.009259 | 0.009308 | 308 |
| 0.009451 | 0.009501 | 314 |
| 0.009644 | 0.009695 | 320 |
| 0.009838 | 0.009889 | 326 |
| 0.010032 | 0.010083 | 332 |
| 0.010226 | 0.010278 | 338 |
| 0.010421 | 0.010474 | 344 |
| 0.010616 | 0.01067 | 350 |
| 0.010812 | 0.010866 | 356 |
| 0.011009 | 0.011063 | 362 |
| 0.011205 | 0.011126 | 368 |
| 0.011403 | 0.011458 | 374 |
| 0.011601 | 0.011657 | 380 |
| 0.011799 | 0.011855 | 386 |
| 0.011998 | 0.012055 | 392 |
| 0.012197 | 0.012255 | 398 |
| 0.012397 | 0.012455 | 404 |
| 0.012597 | 0.012656 | 410 |
| 0.012798 | 0.012857 | 416 |
| 0.012999 | 0.013059 | 422 |
| 0.013201 | 0.013261 | 428 |
| 0.013404 | 0.013464 | 434 |
| 0.013607 | 0.013668 | 440 |
| 0.01381 | 0.013872 | 446 |
| 0.014014 | 0.014076 | 452 |
| 0.014219 | 0.014282 | 458 |
| 0.014424 | 0.014487 | 464 |
| 0.014629 | 0.014693 | 470 |
| 0.014836 | 0.0149 | 476 |
| 0.015042 | 0.015107 | 482 |
| 0.01525 | 0.015315 | 488 |

Fig.9.44.

| | | |
|---|---|---|
| 0.015458 | 0.015524 | 494 |
| 0.015666 | 0.015733 | 500 |
| 0.015875 | 0.015942 | 506 |
| 0.016085 | 0.016153 | 512 |
| 0.016295 | 0.016363 | 518 |
| 0.016506 | 0.016575 | 524 |
| 0.016717 | 0.016787 | 530 |
| 0.016929 | 0.016999 | 536 |
| 0.017142 | 0.017213 | 542 |
| 0.017355 | 0.017426 | 548 |
| 0.017569 | 0.017641 | 554 |
| 0.017784 | 0.017856 | 560 |
| 0.017999 | 0.018072 | 566 |
| 0.018215 | 0.018288 | 572 |
| 0.018431 | 0.018505 | 578 |
| 0.018648 | 0.018723 | 584 |
| 0.018866 | 0.018941 | 590 |
| 0.019085 | 0.01916 | 596 |
| 0.019304 | 0.019379 | 602 |
| 0.019523 | 0.0196 | 608 |
| 0.019744 | 0.019821 | 614 |
| 0.019998 | 0.020076 | 620.9 |
| 0.020187 | 0.020265 | 626 |
| 0.020409 | 0.020488 | 632 |
| 0.020632 | 0.020711 | 638 |
| 0.020856 | 0.020936 | 644 |
| 0.021081 | 0.021161 | 650 |
| 0.021306 | 0.021387 | 656 |
| 0.021533 | 0.021614 | 662 |
| 0.021759 | 0.021841 | 668 |
| 0.021987 | 0.022069 | 674 |
| 0.022215 | 0.022298 | 680 |
| 0.022445 | 0.022528 | 686 |
| 0.022674 | 0.022758 | 692 |
| 0.022905 | 0.022989 | 698 |
| 0.023137 | 0.023221 | 704 |

Fig.9.45.

| | | | | |
|---|---|---|---|---|
| 0.023369 | 0.023454 | 710 | | |
| 0.023602 | 0.023688 | 716 | | |
| 0.023836 | 0.023922 | 722 | | |
| 0.02407 | 0.024157 | 728 | | |
| 0.024306 | 0.024393 | 734 | | |
| 0.024542 | 0.02463 | 740 | | |
| 0.02478 | 0.024868 | 746 | | |
| 0.025018 | 0.025107 | 752 | | |
| 0.025256 | 0.025346 | 758 | | |
| 0.025496 | 0.025586 | 764 | | |
| 0.025737 | 0.025828 | 770 | | |
| 0.025979 | 0.02607 | 776 | | |
| 0.026221 | 0.026313 | 782 | | |
| 0.026464 | 0.026557 | 788 | | |
| 0.026709 | 0.026802 | 794 | | |
| 0.026954 | 0.027047 | 800 | | |
| 0.0272 | 0.027294 | 806 | | |
| 0.027447 | 0.027542 | 812 | | |
| 0.027695 | 0.02779 | 818 | | |
| 0.027945 | 0.02804 | 824 | | |
| 0.028195 | 0.028291 | 830 | | |
| 0.028446 | 0.028542 | 836 | | |
| 0.028698 | 0.028795 | 842 | | |
| 0.028951 | 0.029049 | 848 | | |
| 0.029205 | 0.029303 | 854 | | |
| 0.02946 | 0.029559 | 860 | | |
| 0.029717 | 0.029816 | 866 | | |
| 0.029974 | 0.030074 | 872 | | |
| 0.030233 | 0.030333 | 878 | | |
| 0.030492 | 0.030593 | 884 | | |
| 0.030753 | 0.030854 | 890 | | |
| 0.031015 | 0.031117 | 896 | | |
| 0.031278 | 0.03138 | 902 | | |
| 0.031542 | 0.031645 | 908 | | |
| 0.031807 | 0.031911 | 914 | | |
| 0.032074 | 0.032178 | 920 | | |

Fig.9.46.

| | | |
|---|---|---|
| 0.032341 | 0.032446 | 926 |
| 0.03261 | 0.032715 | 932 |
| 0.032881 | 0.032986 | 938 |
| 0.033152 | 0.033258 | 944 |
| 0.033425 | 0.033532 | 950 |
| 0.033699 | 0.033806 | 956 |
| 0.033974 | 0.034082 | 962 |
| 0.034251 | 0.034359 | 968 |
| 0.034529 | 0.034638 | 974 |
| 0.034809 | 0.034918 | 980 |
| 0.035001 | 0.03511 | 984.1 |
| 0.035372 | 0.035482 | 992 |
| 0.035656 | 0.035767 | 998 |
| 0.035941 | 0.036052 | 1004 |
| 0.036228 | 0.036634 | 1010 |
| 0.036516 | 0.036628 | 1016 |
| 0.036806 | 0.036919 | 1022 |
| 0.037097 | 0.037211 | 1028 |
| 0.03739 | 0.037504 | 1034 |
| 0.037684 | 0.037799 | 1040 |
| 0.037798 | 0.038096 | 1046 |
| 0.038278 | 0.038394 | 1052 |
| 0.038578 | 0.038694 | 1058 |
| 0.038879 | 0.038996 | 1064 |
| 0.039182 | 0.039299 | 1070 |
| 0.039487 | 0.039605 | 1076 |
| 0.039794 | 0.039912 | 1082 |
| 0.040102 | 0.040221 | 1088 |
| 0.040412 | 0.040532 | 1094 |
| 0.040725 | 0.040845 | 1100 |

TIN = 1300 K

Fig.9.47.

| FAR | FARA | TRISE |
|---|---|---|
| 0.006016 | 0.006065 | 200 |
| 0.006206 | 0.006255 | 206 |
| 0.006396 | 0.006446 | 212 |
| 0.006586 | 0.006637 | 218 |
| 0.006777 | 0.006829 | 224 |
| 0.006969 | 0.007021 | 230 |
| 0.007161 | 0.007213 | 236 |
| 0.007353 | 0.007406 | 242 |
| 0.007546 | 0.007599 | 248 |
| 0.007739 | 0.007793 | 254 |
| 0.007933 | 0.007987 | 260 |
| 0.008127 | 0.008182 | 266 |
| 0.008322 | 0.008377 | 272 |
| 0.008517 | 0.008573 | 278 |
| 0.008713 | 0.008769 | 284 |
| 0.008909 | 0.008966 | 290 |
| 0.009105 | 0.009163 | 296 |
| 0.009303 | 0.009361 | 302 |
| 0.0095 | 0.009559 | 308 |
| 0.009698 | 0.009757 | 314 |
| 0.009897 | 0.009956 | 320 |
| 0.010096 | 0.010156 | 326 |
| 0.010295 | 0.010356 | 332 |
| 0.010495 | 0.010557 | 338 |
| 0.010696 | 0.010758 | 344 |
| 0.010897 | 0.010959 | 350 |
| 0.011099 | 0.011162 | 356 |
| 0.011301 | 0.011364 | 362 |
| 0.011504 | 0.011568 | 368 |
| 0.011707 | 0.011771 | 374 |
| 0.011911 | 0.011976 | 380 |
| 0.012115 | 0.01218 | 386 |
| 0.01232 | 0.012386 | 392 |

Fig.9.48.

| | | |
|---|---|---|
| 0.012525 | 0.012592 | 398 |
| 0.012731 | 0.012798 | 404 |
| 0.012938 | 0.013005 | 410 |
| 0.013145 | 0.013213 | 416 |
| 0.013352 | 0.013421 | 422 |
| 0.013561 | 0.01363 | 428 |
| 0.013769 | 0.013839 | 434 |
| 0.013979 | 0.014049 | 440 |
| 0.014189 | 0.01426 | 446 |
| 0.014399 | 0.014471 | 452 |
| 0.014611 | 0.014682 | 458 |
| 0.014822 | 0.014895 | 464 |
| 0.015035 | 0.015108 | 470 |
| 0.015248 | 0.015321 | 476 |
| 0.015461 | 0.015535 | 482 |
| 0.015675 | 0.01575 | 488 |
| 0.01589 | 0.015965 | 494 |
| 0.016106 | 0.016181 | 500 |
| 0.016322 | 0.016398 | 506 |
| 0.016539 | 0.016615 | 512 |
| 0.016756 | 0.016833 | 518 |
| 0.016974 | 0.017052 | 524 |
| 0.017193 | 0.017271 | 530 |
| 0.017413 | 0.017491 | 536 |
| 0.017633 | 0.017712 | 542 |
| 0.017853 | 0.017933 | 548 |
| 0.018075 | 0.018155 | 554 |
| 0.018297 | 0.018378 | 560 |
| 0.01852 | 0.018601 | 566 |
| 0.018744 | 0.018826 | 572 |
| 0.018968 | 0.01905 | 578 |
| 0.019193 | 0.019276 | 584 |
| 0.019419 | 0.019502 | 590 |
| 0.019645 | 0.019729 | 596 |
| 0.019872 | 0.019957 | 602 |
| 0.020002 | 0.020086 | 605.4 |

Fig.9.49.

| | | |
|---|---|---|
| 0.020329 | 0.020415 | 614 |
| 0.020559 | 0.020645 | 620 |
| 0.020789 | 0.020876 | 626 |
| 0.02102 | 0.021107 | 632 |
| 0.021252 | 0.02134 | 638 |
| 0.021485 | 0.021573 | 644 |
| 0.021718 | 0.021807 | 650 |
| 0.021952 | 0.022042 | 656 |
| 0.022188 | 0.022278 | 662 |
| 0.022424 | 0.022514 | 668 |
| 0.02266 | 0.022751 | 674 |
| 0.022898 | 0.02299 | 680 |
| 0.023137 | 0.023229 | 686 |
| 0.023376 | 0.023469 | 692 |
| 0.023616 | 0.023709 | 698 |
| 0.023857 | 0.023951 | 704 |
| 0.024099 | 0.024194 | 710 |
| 0.024342 | 0.024437 | 716 |
| 0.024586 | 0.024681 | 722 |
| 0.024831 | 0.024927 | 728 |
| 0.025077 | 0.025173 | 734 |
| 0.025323 | 0.02542 | 740 |
| 0.025571 | 0.025669 | 746 |
| 0.02582 | 0.025918 | 752 |
| 0.026069 | 0.026168 | 758 |
| 0.02632 | 0.026419 | 764 |
| 0.026572 | 0.026671 | 770 |
| 0.026824 | 0.026924 | 776 |
| 0.027078 | 0.027179 | 782 |
| 0.027333 | 0.027434 | 788 |
| 0.027588 | 0.02769 | 794 |
| 0.027845 | 0.027948 | 800 |
| 0.028103 | 0.028206 | 806 |
| 0.028362 | 0.028466 | 812 |
| 0.028622 | 0.028726 | 818 |
| 0.028884 | 0.028988 | 824 |

Fig.9.50.

| | | |
|---|---|---|
| 0.029146 | 0.029251 | 830 |
| 0.02941 | 0.029515 | 836 |
| 0.029675 | 0.029781 | 842 |
| 0.029941 | 0.030047 | 848 |
| 0.030208 | 0.030315 | 854 |
| 0.030476 | 0.030584 | 860 |
| 0.030746 | 0.030854 | 866 |
| 0.031017 | 0.031125 | 872 |
| 0.031289 | 0.031398 | 878 |
| 0.031562 | 0.031672 | 884 |
| 0.031837 | 0.031947 | 890 |
| 0.032113 | 0.032224 | 896 |
| 0.032391 | 0.032502 | 902 |
| 0.032669 | 0.032781 | 908 |
| 0.03295 | 0.033062 | 914 |
| 0.033231 | 0.033344 | 920 |
| 0.033514 | 0.033628 | 926 |
| 0.033799 | 0.033913 | 932 |
| 0.034085 | 0.034199 | 938 |
| 0.034372 | 0.034487 | 944 |
| 0.034661 | 0.034777 | 950 |
| 0.035001 | 0.035117 | 957 |
| 0.035244 | 0.035361 | 962 |
| 0.035538 | 0.035655 | 968 |
| 0.035833 | 0.035951 | 974 |
| 0.03613 | 0.036249 | 980 |
| 0.036429 | 0.036548 | 986 |
| 0.036729 | 0.036849 | 992 |
| 0.037032 | 0.037151 | 998 |
| 0.037336 | 0.037456 | 1004 |
| 0.037641 | 0.037762 | 1010 |
| 0.037949 | 0.03807 | 1016 |
| 0.038258 | 0.03838 | 1022 |
| 0.03857 | 0.038692 | 1028 |
| 0.038883 | 0.039006 | 1034 |
| 0.039198 | 0.039322 | 1040 |

Fig.9.51.

| | | | |
|---|---|---|---|
| 0.039516 | 0.03964 | 1046 | |
| 0.039835 | 0.03996 | 1052 | |
| 0.040156 | 0.040281 | 1058 | |
| 0.040480 | 0.040606 | 1064 | |
| 0.040806 | 0.040932 | 1070 | |
| 0.041134 | 0.04126 | 1076 | |
| 0.041464 | 0.041591 | 1082 | |
| 0.041796 | 0.041924 | 1088 | |
| 0.042131 | 0.04226 | 1094 | |
| 0.042469 | 0.042598 | 1100 | |

METHOD AND SYSTEM FOR CONTROLLING FUEL SUPPLY IN A COMBUSTION TURBINE ENGINE

The present invention relates to the control system for a combustion turbine engine, particularly an engine whose combustion system has been designed with a view to reducing emission levels or pollutants in its exhaust.

EP-B-0680554 disclosed a method of scheduling fuel flow to a combustion turbine engine, and a control system for such fuel flow scheduling, in which a plurality of engine fuel flow governors were provided in parallel with each other. The governor which outputted the lowest fuel demand signal was used as the one which scheduled the total fuel flow to the engine. It did this by having a plurality of combustion stages with pre-determined temperature limits for the combustion process in each stage. Then the fuel flows to those stages were scheduled to achieve the lowest fuel flows consistent with the pre-defined temperature limits. Thus, the engine had a combustor with a plurality of stages, and the fuel flow to each stage varied to achieve the desired temperatures. In the detailed example of EP-B-0680554 there were three stages, the primary stage, a secondary stage and a tertiary stage.

In particular, EP-A-0680554 discloses a method of scheduling fuel flow to a combustion turbine engine, comprising the steps of putting a plurality of engine flow governors in parallel with each other, letting the governor which outputs the lowest fuel demand signal be the one which schedules the total fuel flow to the engine, wherein there are a plurality of combustion stages, defining predetermined temperature limits for the combustion process in each stage of combustion, and individually scheduling fuel flows to the plurality of combustion stages to achieve the lowest fuel flows consistent with the predetermined temperature limits for the corresponding stages of combustion.

However, in order to control accurately the amount of fuel supplied to such a multi-staged combustor, it was thought necessary accurately to calculate the characteristics of the various stages. Such a calculation was discussed in EP-B-0765998 which considered the various parameters thought to be relevant to the determination of the temperatures of the various stages, and proposed a calculation protocol to determine those temperatures and thus determine the values needed for regulating the fuel flow to the respective stages.

Such regulation is desirable because NOx emissions increase when the temperature is too high due to dissociation of atmospheric nitrogen, and CO emissions result from incomplete combustion at too low a temperature. Therefore, the temperatures of the respective stages need to be correct in order to give the right characteristics, and the temperatures themselves are achieved by suitable control of the fuel flow to each stage.

In the systems envisaged in EP-A-0680554, the amount of fuel fed to the primary zone of a combustor, in order to achieve a desired primary zone exit temperature, is determined based on measured gas fuel properties, ambient humidity, and inferred engine air flow. The fuel flow is metered using the fuel metering valve geometric characteristics, fuel pressures, and the measured fuel properties. The value is then trimmed based on fuel mass readings from coriolis flow meters. Once the fuel flow for the primary zone is determined, the remaining fuel will achieve the desired power level fed to the secondary zone or to other zones if present.

However, such an arrangement involves measurements using a gas chromatograph, a humidity sensor, and coriolis flow meters. The cost of these components is a significant cost of the resulting engine. Therefore, it is desirable to provide a way of regulating the fuel flow which does not require so many measurements.

The present invention is based on the realisation that variation due to several of the factors considered in EP-B-0680554 and EP-B-0765998 may be discounted if ratios are considered in the calculations, rather than absolute values. For example, since the fuel is the same throughout the engine, the use of ratios cancels out the need for gas composition values, removing the need for a gas chromatograph.

Thus, the present invention may derive a value representing the total enthalpy rise in the combustor from the inlet and outlet temperatures of the combustor, and that value is used to determine a desired enthalpy rise in the primary zone, using the inlet temperature and the desired value for the temperature at the outlet of the primary zone. Since some factors in the determination of the total enthalpy rise will be cancelled out in the determination of the enthalpy rise in the primary zone, and ambient humidity, the calculation of its ratio of these values need not consider all of the factors which affect enthalpy.

It has then been realised that other factors than enthalpy may be used whose ratios are substantially equivalent with the ratio of the total enthalpy rise in the combustor to the enthalpy rise in the primary zone. A quantity known as equivalence ratio may be defined, being the fuel/air ratio of the appropriate part of the combustor to the stoichiometric fuel/air ratio. Thus, the average equivalence ratio of the combustor is the ratio of the total fuel/air ratio of the combustor to the stoichiometric fuel/air ratio, and the primary zone equivalence is the fuel/air ratio of the primary zone relative to the stoichiometric fuel/air ratio.

The equivalence ratios are themselves closely related to enthalpy rises, and therefore may be used in the method of the present invention rather than those enthalpy rises.

It may further be seen that since stoichimetric fuel/air ratio is used in both terms, its effect will be cancelled out in any ratio of equivalence ratios and therefore it is possible to use the fuel/air ratios themselves in the method of the present invention.

It is further possible to use the temperature rises across the combustor and across the primary zone respectively, and also the amount of the fuel flow through the combustor and primary zone.

Thus, the present invention may provide a method of regulating fuel flow to a combustion turbine engine, said engine having a combustor including an inlet, an outlet, a primary combustion zone and at least one further combustion zone, the total fuel supplied to the combustor being divided between primary fuel supplied to said primary combustion zone and other fuel supplied to said at least one further combustion zone, the scheduling of the fuel comprising regulating the fuel ratio of said primary fuel to said total fuel; wherein:

the inlet and outlet temperatures at the inlet and outlet of said combustor are determined;

a first value representing a first predetermind property of said combustor is determined from said inlet and outlet temperatures;

a second value representing a second predetermined property of the primary zone is determined from the current value of said total fuel ratio and said first value, the temperature at the outlet of the primary zone is determined from the inlet temperatures and said second value;

the temperature at the outlet of the primary zone is compared with a predetermined temperature, thereby to derive a difference value and generate a control signal dependent on said difference value; and the primary fuel is varied, thereby to vary said fuel ratio, the varying of the primary fuel being such as to reduce said control signal;

wherein said first predetermined property is one of: the total enthalpy rise in said combustor, the equivalence ratio of said combustor, the fuel/air ratio of said combustor, the temperature rise across said combustor, the fuel flow through said combustor; and said second predetermined property is the corresponding one of: the enthalpy rise in said primary zone, the equivalence ratio of said primary zone, the fuel/air ratio of said primary zone; the temperature rise across said primary zone, or the fuel flow through the primary zone.

The present invention has the advantage that the use of ratios eliminates the need for a gas chromatograph, flow meters and humidity sensors to determine the properties of the gas.

The temperature at the inlet to the combustor may be determined by a suitable sensor, but it may be less straightforward to determine the temperature at the outlet of the combustor, since the operating temperatures at that outlet may be too high or non-uniform for them to be reliably or economically measured by practical instruments. However, a development of the present invention proposed that the temperature of the outlet of the combustor be determined from the temperature measured in a cooler location, for example adjacent to the inlet to the final turbine. Here, the temperature has fallen sufficiently to be measured by practical instruments, and it is found that a determination of the compressor outlet temperature using a temperature value measured at or adjacent to the final turbine is sufficiently accurate to enable the present invention to be used without significant inaccuracy.

Preferably, the method of the present invention is applied as a series of iterations, wherein the determination of the inlet and outlet temperatures, the determination of the first and second values, and the determination of the temperature are carried out repeatedly at suitable time intervals, and the comparison of the temperature with the predetermined temperature to generate successive control signals are then used to vary the primary fuel.

The intervals between the iterations may be of the order of several seconds, with the operation of the engine maintained between those iterations by e.g. the use of values derived from the method of the present invention in the process of EP-B-0680554 referred to above. Alternatively, a feed-back arrangement may be used to generate responses to transient variations in engine behaviour.

Figure 2:
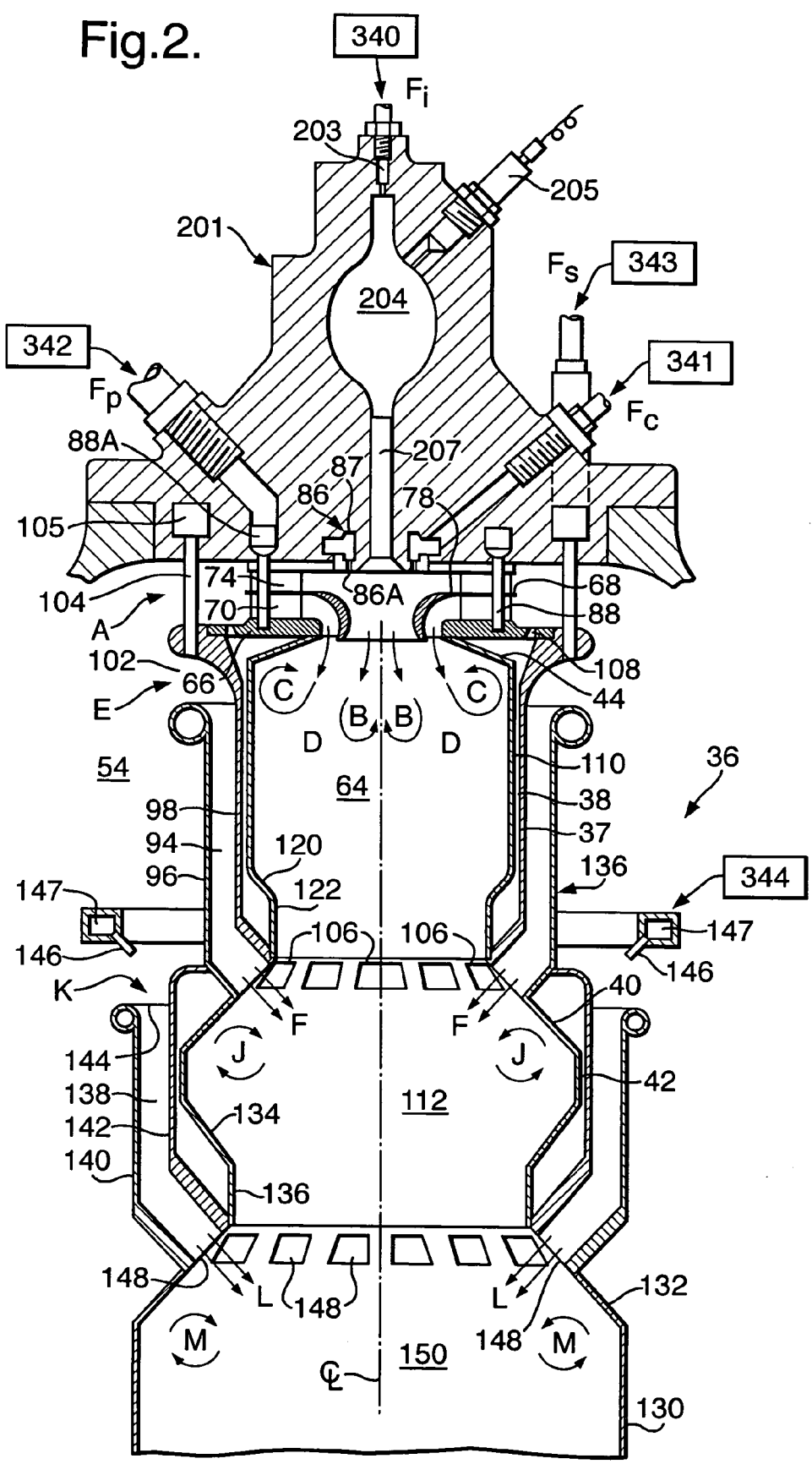
Figure 3:
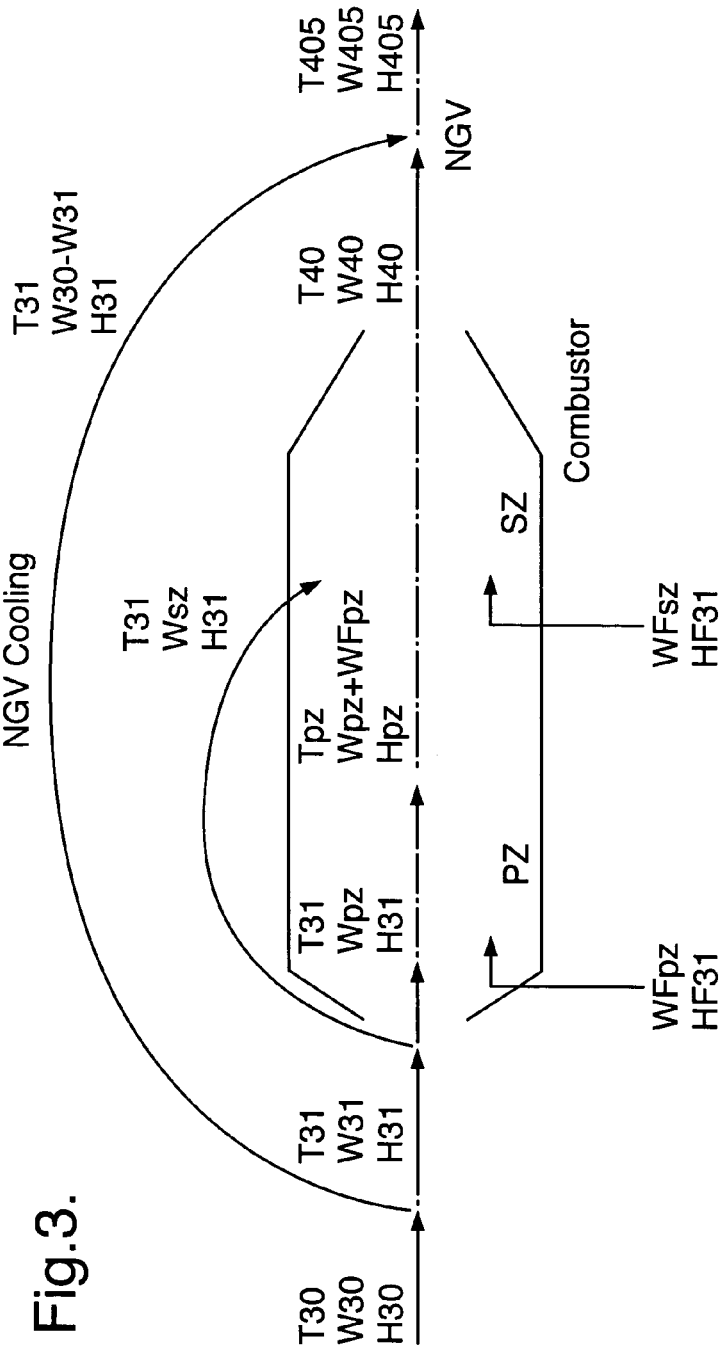
Figure 4:
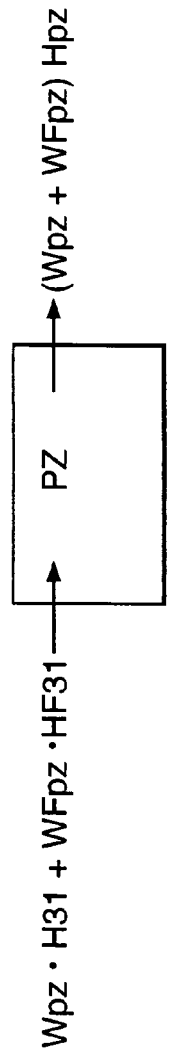
Figure 5:
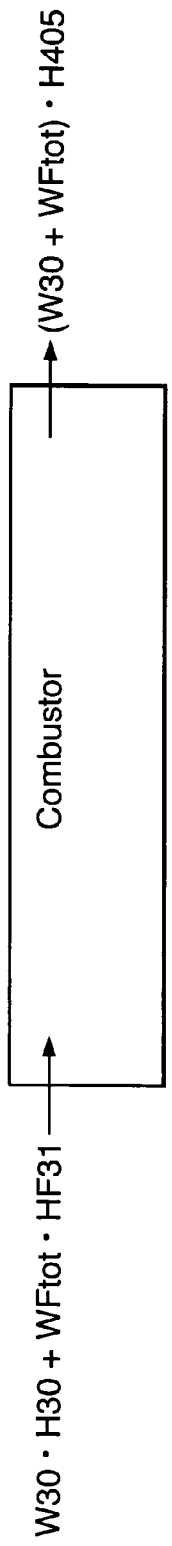
Figure 6:
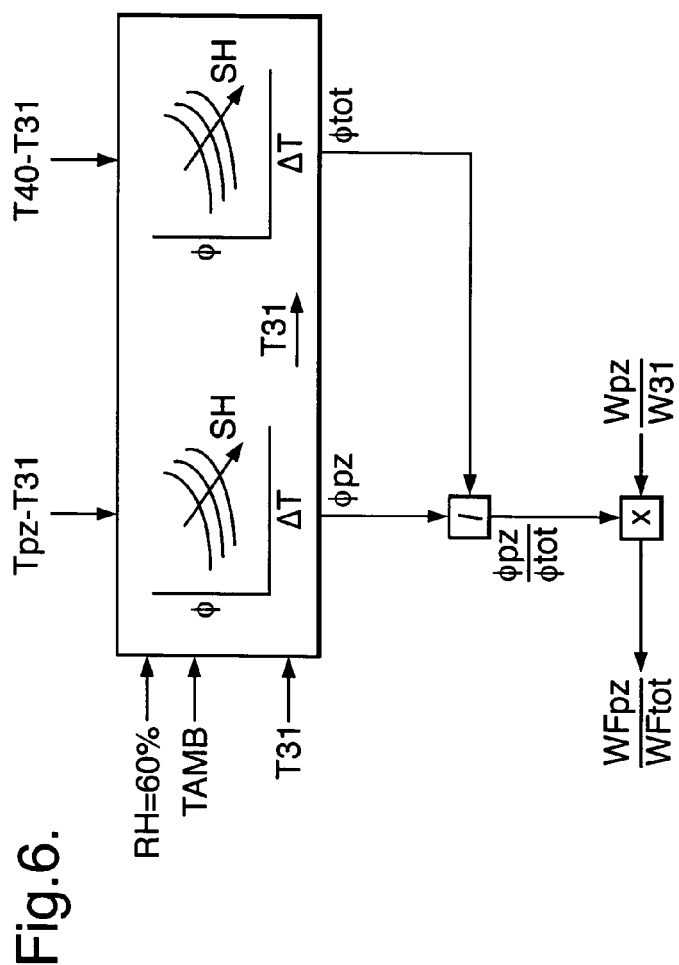
Figure 7:
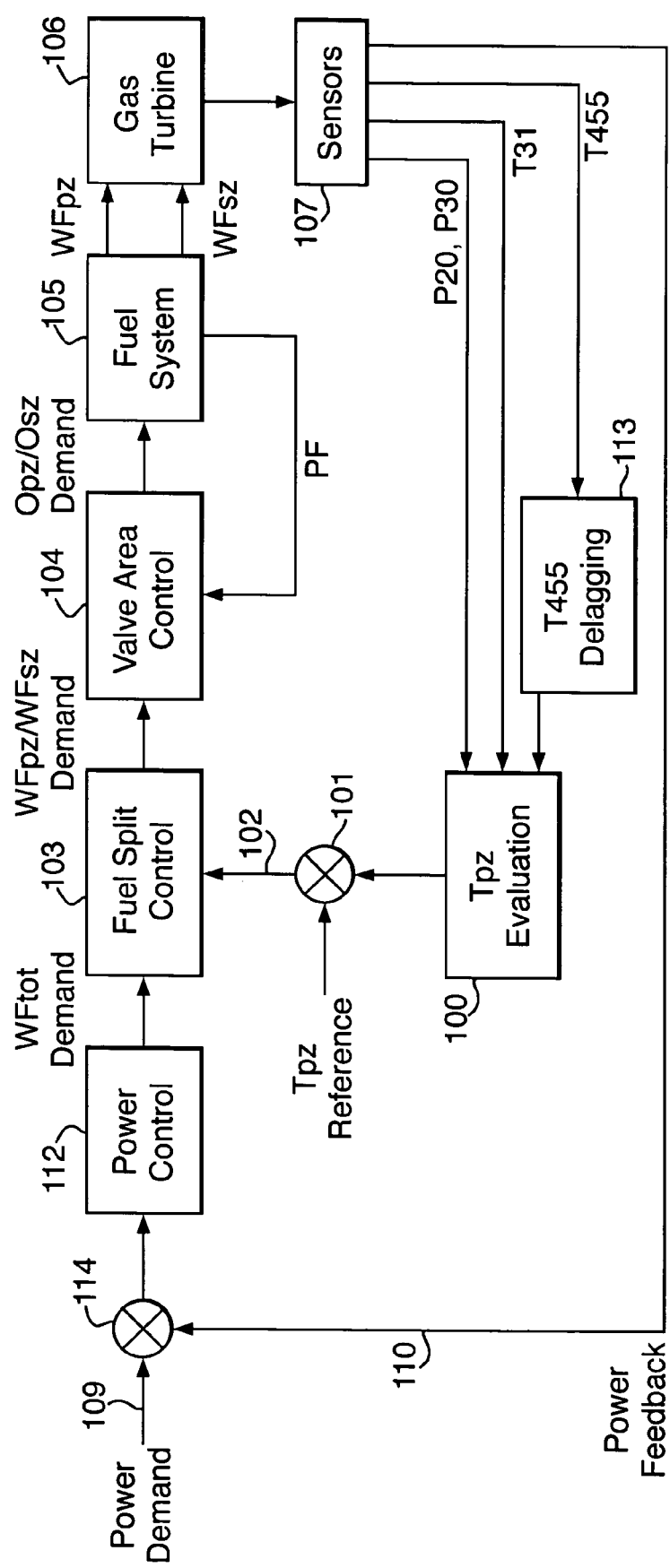
Figure 8:
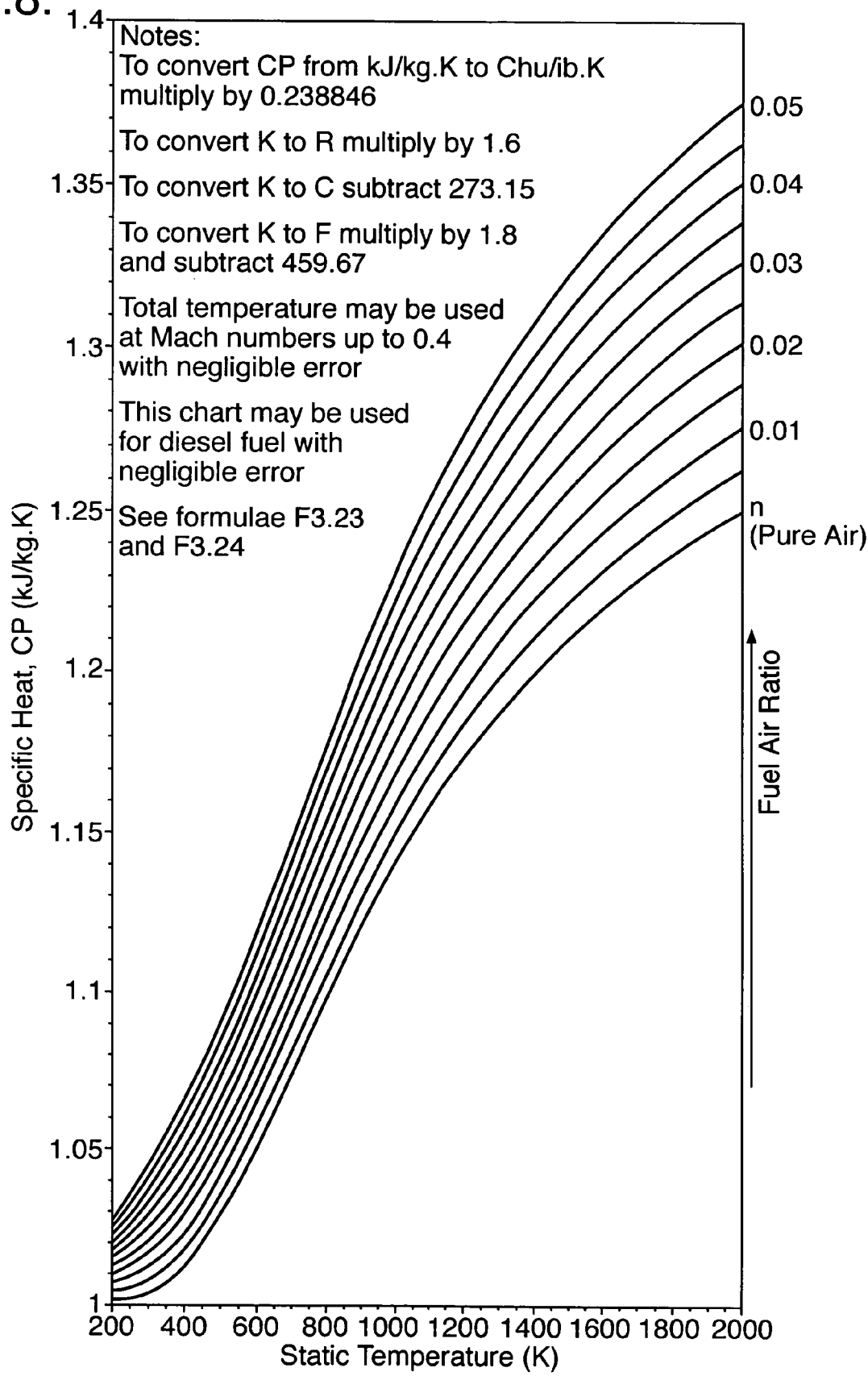

Embodiments of the present invention will now be described in detail, by way of example, with reference to the accompanying drawings in which:

FIG. 1. is a schematic diagram of the combustion turbine engine in which the present invention may be embodied;

FIG. 2. is a schematic diagram of the combustor of the engine of FIG. 1;

FIG. 3. illustrates parameters of operation of the engine;

FIG. 4. is a diagram illustrating the energy balance for the primary zone of the combustor of FIG. 2;

FIG. 5. is a diagram showing the energy balance of the combustor of FIG. 2;

FIG. 6. shows pages in the determination of the equivalence ratios;

FIG. 7. is a block diagram of the control loop for operating the invention of FIG. 1. in accordance with the present invention;

FIG. 8. is a graph illustrating the relationship between specific heat, temperature and fuel-air ratio for kerosene; and FIGS. 9.01 to 9.51 are a table illustrating the relationship between a combustor temperature rise, fuel-air ratio and combustor inlet temperature.

First, the general structure of a typical combustion turbine engine in which the present invention may be embodied will be described with reference to FIGS. 1 and 2. Referring to FIG. 1, an industrial gas turbine engine 10 comprises in axial flow series an air inlet 12, a low pressure (LP) compressor section 14, a high pressure (HP) compressor section 15, a combustor section 16, an HP turbine section 17, an LP turbine section 18, a power turbine section 20, and an exhaust gas outlet 22. The HP and LP turbine sections 17, 18 drive the corresponding compressor sections 15, 14 through concentric shafts (not shown) within the engine, each assembly of a turbine and a compressor joined together by a shaft being called a "spool". The power turbine section 20 drives a load 26 by means of a shaft 24. In this instance load 26 is indicated as an electrical generator, but could alternatively be, for instance, a pumping set for an oil, water, or gas pipeline. Note also that a power turbine may not be needed and direct drive may be provided from the turbine engine.

In order to avoid surging of the compressor under certain engine load conditions, the compressor sections 14 and/or 15 may be provided with bleed valves (not shown) for venting excess air.

In the combustor 16 there are disposed, say, nine separate combustion chambers 36, the arrangement of only one of these being indicated by the dashed lines. Their heads 200 project radially outwards of the rest of the engine. The combustion chambers 36 are equiangularly spaced around the longitudinal X of the engine. In this embodiment, all the combustion changers are ignited and maintain their combustion independently of each other, and each therefore requires its own fuel igniter unit 201. It may also be possible to use an annular combustor.

The discharge ends 202 of the combustion chamber 36 are turned from the radial to the downstream axial direction so that the combustion gasses are discharged directly into the HP turbine 17, past nozzle guide vanes 90 to which they are secured.

The fuel is supplied to the combustor 16 through five different sets of injectors and burns in three modes.

The igniter units 201 have fuel injectors (not shown in this figure) which receive fuel $F_i$ from a fuel manifold shown diagrammatically as box 340. The combustion chamber heads 200 receive a total amount of fuel $F_T$ as separate fuel supplies to four other sets of fuel injectors (not shown in this figure) from four corresponding fuel manifolds, indicated diagrammatically by boxes 341–344. Fuel supplies to the fuel manifolds are controlled by corresponding fuel metering units 350–354, which in turn are controlled by a fuel control system 300, shown in more detail in FIG. 3. Each combustor head 200 of course also receives high pressure air from the outlet of the HP compressor section 15 for mixing with the fuel within the combustion chamber.

Turning now to FIG. 2, the operation of one of the combustion chambers 36 will be briefly described with particular reference to the five sets of fuel injectors and three combustion modes mentioned above. If a more complete description of this type of combustion chamber and its operation is required, with the exception of the ignition arrangements, our International patent publication WO92/07221 should be consulted.

Ignition Mode

Initial ignition of each combustion chamber 36 is achieved by ignition unit 201 from a small flow of gas fuel $F_i$ supplied from manifold 340 and injected through a torch injector 203 into a small ignition chamber 204 radially adjacent to the combustion chamber. The ignition chamber 204 receives an air bleed (not shown) from the head of the combustion chamber 36. The resulting fuel and air mixture is ignited from a high energy or high tension electrical ignition source 205. This results in the propagation of a flame down the connecting tube 207 into the top of the main combustion chamber 36, where it ignites the fuel emitted from the central injector 86. The torch injector is only enabled during start up of the engine, and is disabled thereafter.

Primary Diffusion Mode

Central injector 86 comprises an annular fuel gallery 87 surrounding the connecting tube 207, with circular array of holes 86A which inject jets of gas from the gallery into the top of the combustion chamber. Gallery 87 is fed from manifold 341 with a flow of gas $F_c$. The gas is added to primary air A, some of which flows directly past injector 86 after it has been preswirled by passing through a tier of swirl vanes 74. Consequently, there is created a locally fuel rich mixture in a vortex B surrounding the centreline CL of the combustion chamber, where diffusion causes mixing of the primary air and the fuel. This sustains combustion in the primary zone 64. A separate annular vortex C, formed by the rest of the primary air A after it has been preswirled by flowing past another tier of vanes 70, remains an air only region. A shear layer D forms between the two vortices.

The above described diffusion flame combustion mode enables stable combustion at low fuel flows and low compressor deliver temperatures, but it results in locally high flame temperatures, and hence relatively high NOx emissions. Therefore, its use is limited to starting and where engine load and ambient conditions are outside the lean burn operating range.

As the power required from the engine increases, all the fuel flow through the central injector 86 is transferred to the main lean burn primary and secondary injectors, which are described below. The changeover point can be determined as described later.

Low Emission Mode

The aim in this mode is to keep the combustion temperatures within a range which is sufficiently narrow to avoid excessive production of NOx due to dissociation reactions at higher temperatures and CO at lower temperatures, while at the same time ensuring that the residence time of the fuel and air and the intermediate combustion products in the combustion zone(s) is long enough to achieve substantially complete combustion, so avoiding large emissions of CO and UHC's.

To this end, the main primary, secondary, and if needed, tertiary combustion stages adopt the principle of premixing the fuel and air at ratios weaker than stoichiometric prior to their entry to the combustor to enable a lean burn type of combustion. However, secondary and any subsequent stage of combustion takes place with an input from the products of combustion from the preceding stage.

Main Primary. A circular array of main primary injectors 88 are connected to an annular fuel supply gallery 88A, which receives fuel $F_p$ from manifold 342. The injectors 88 inject gas fuel into the lower and upper sets of passages formed by the two tiers of preswirl vanes 70, 74, respectively, which are separated by an annular wall 78. This ensures that the fuel and air are partially premixed in ratios weaker than stoichiometric before the reactants enter the primary combustion zone 64. Because the two sets of preswirl vanes 70, 74 are orientated to impart opposite senses of rotation to the air flowing between them, burning in the primary zone 64 takes place in two separate vortices B and C of opposite hand, separated by a shear layer D, giving improved mixing turbulence. This thorough mixing enables combustion temperatures to be controlled to approximately 1850° K, low enough to prevent significant dissociation of nitrogen in the combustion process, thereby preventing formation of much NOx.

Additional secondary and optionally tertiary combustion stages are required so that combustion can proceed to completion in a sufficiently controlled manner at all important operating conditions.

Secondary. Secondary combustion takes place in the secondary combustion zone 112 of the combustion chamber 36. Again, a lean burn type of combustion is achieved, this time by utilising a circular array of injectors 104 connected to an annular fuel gallery 105 to inject fuel gas into the opening 102 of an annular duct 94 which surrounds the primary combustion zone 64. The secondary fuel flow Fs is supplied from the manifold 343. Fuel so injected premixes with the secondary air E from the compressor exit as it enters the duct 94. The mixture enters the secondary combustion zone 112 as a circular array of discrete jets F directed towards the centre of the zone from apertures 106. There, further combustion takes place with the products of combustion from the primary zone 64. Note that to achieve more thorough mixing, the secondary zone 112 is shaped so as to encourage the development of vortices J which recirculate some of the fuel/air mixture and partial products of combustion into the mixing zone where the jets F penetrate the primary combustion products. In this stage the temperature of combustion is controlled within upper and lower limits, nominally 1800–1600° K, to ensure that no further NOx will form, while minimising CO.

Tertiary. When tertiary combustion is required, a similar lean burn process is initiated in tertiary combustion zone 150 by injecting further gas fuel from injectors 146 into tertiary air K entering the opening 144 of an annular duct 138 which surrounds the second combustion zone 112. The injectors are supplied with fuel from the manifold 344 through a gallery 147. The tertiary combustion process will not be further described because it is so similar to the secondary process described above, as can be seen from FIG. 2. Combustion temperature range is also similar.

Combustion Temperature in Low Emission Mode

The careful mixing in the lean burn primary zone 64 is designed to produce a constant combustion temperature of about 1850° K. The temperature in the secondary zone is not allowed to exceed 1800° K and for the most part the careful control of the mixing process of primary combustion products with the secondary premixed reactants produces combustion temperatures within the range 1600° K to 1800° K. However, if the tertiary combustion stage is also active, the temperature in the secondary zone is modulated within the said range and the temperature in the tertiary zone is controlled within the range 1600° K to 1800° K.

Control System

The control system used by this embodiment of the present invention will now be described in more detail. In the present invention, fuel split ratio is calculated using the total enthalpies at the exit of the primary zone (Hpz) and the nozzle guide vane (NGV) throat (H405). The ratio of enthalpy gains in the primary zone and in the combustor as a whole equals the primary to total fuel flow ratio. The algorithm defines the required portion of the total fuel flow into the primary zone to achieve a target primary zone temperature.

Thus, the resulting parameters of the operation of the engine of FIGS. 1 and 2 can be analysed as shown in FIG. 3, with the parameters T representing temperature, the parameters W representing air flow and the parameter H representing specific enthalpy. FIG. 4 also illustrates the energy balance for the primary zone. Thus, the following relationships hold:

Energy (i.e. total enthalpy) entering the primary zone $$Ei = Wpz \cdot H31 + WFpz \cdot HF31$$

Energy leaving the primary zone $$Eo = (Wpz + WFpz) \cdot Hpz$$

Energy increase in the primary zone equals the energy released by burning primary fuel $$Eo - Ei = (Wpz + WFpz) \cdot Hpz - Wpz \cdot H31 - WFpz \cdot HF31$$

$$Eo - Ei = WFpz \cdot LCV \cdot \eta pz$$

hence $$WFpz \cdot LCV \cdot \eta pz = (Wpz + WFpz) \cdot Hpz - Wpz \cdot H31 - WFpz \cdot HF31$$

The energy balance for the whole combustor is illustrated in FIG. 5. Thus the following relationships hold:

Energy entering the combustor $$Ei = W30 \cdot H30 + Wftot \cdot HF31$$

Energy leaving the combustor $$Eo = (W30 + Wftot) \cdot H405$$

Energy increase in the combustor equals the energy released by burning total fuel $$Eo - Ei = (W30 + WFtot) \cdot H405 - W30 \cdot H30 - WFtot \cdot HF31$$

$$Eo - Ei = WFtot \cdot LCV \cdot \eta tot$$

hence $$WFtot \cdot LCV \cdot \eta tot = (W30 + WFtot) \cdot H405 - W30 \cdot H30 - WFtot \cdot HF31$$

The ratio between the energy equations gives the fuel flow ratio $$\frac{WFpz \cdot LCV \cdot \eta pz}{WFtot \cdot LCV \cdot \eta tot (W30 + WFtot) \cdot H405 - W30 \cdot H30 - WFtot \cdot H31} = \frac{(Wpz + WFpz) \cdot Hpz - Wpz \cdot H31 - WFpz \cdot HF31}{}$$

Assumption: $\eta_{pz} = \eta_{tot}$
hence $$WFpz = \frac{(Wpz + WFpz) \cdot Hpz - Wpz \cdot H31 - WFpz \cdot HF31}{WFtot(W30 + WFtot) \cdot H405 - W30 \cdot H30 - WFtot \cdot HF31}$$

An alternative is to use an energy balance equation for the primary zone, and consider the energy balance of the whole combustor illustrated in FIG. 5. Then:

Energy Balance Equation for the Primary Zone $$WFpz \cdot LCV \cdot \eta pz = (Wpz + WFpz) \cdot Hpz - Wpz \cdot H31 - WFpz \cdot HF31$$

Energy entering the combustor $$Ei - E31 \cdot H31 + WFtot \cdot HF31$$

Energy leaving the combustor $$Eo = (W31 + WFtot) \cdot H40$$

Energy increase in the combustor equals the energy released by burning total fuel $$Eo - Ei + (W31 + WFtot) \cdot H40 - W31 \cdot H31 - WFtot \cdot HF31$$

$$Eo - Ei = WFtot \cdot LCV \cdot \eta tot$$

hence $$WFtot \cdot LCV \cdot \eta tot = (W31 + WFtot) \cdot H40 - W31 \cdot H31 - WFtot \cdot HF31$$

The ratio between the energy equations gives the fuel flow ratio $$\frac{WFpz \cdot LCV \cdot \eta pz}{WFtot \cdot LCV \cdot \eta tot(W31 + WFtot) \cdot H40 - W31 \cdot H31 - WFtot \cdot HF31} = \frac{(Wpz + WFpz) \cdot Hpz - Wpz \cdot H31 - WFpz \cdot HF31}{}$$

$$\frac{WFpz \cdot LCV \cdot \eta pz}{WFtot \cdot LCV \cdot \eta tot(31 + WFtot) \cdot H40 - W31 \cdot H31 - WFtot \cdot HF31} = \frac{(Wpz + WFpz) \cdot Hpz - Wpz \cdot H31 - WFpz \cdot HF31}{}$$

Assumption: $\eta_{pz} = \eta_{tot}$
hence $$WFpz = \frac{(WFpz + WFpz) \cdot HPz - Wpz \cdot H31 - WFpz \cdot HF31}{WFtot(W31 + WFtot) \cdot H40 - W31 \cdot H31 - WFtot \cdot HF31}$$

Hence, these equations can be analysed by considering the following properties:

| | |
|---|---|
| FARpz | primary zone fuel air ratio |
| FARs | stoichiometric fuel air ratio |
| FARtot | combustor fuel air ratio |
| mixture( ) | temperature of fuel and air mixture (K) |
| Tinlet | inlet temperature to the combustion zone (K) |
| ΔTpz | temperature rise in the primary zone (K) |
| ΔTtot | temperature rise in the combustor as a whole (K) |
| φLUT( ) | look up table for equivalence ratio as a function of inlet temperature and temperature rise |
| φpz | primary zone equivalence ratio |
| φtot | combustor average equivalence ratio |

This implementation of the method primarily uses the relationship between combustion equivalence ratio and temperature rise.

$$\Delta Tpz = Tpz \text{ target} - Tinlet$$

$$\Delta Ttot = T40 - Tinlet$$

$$Tinlet = T31 \text{ or mixture } (T31, \text{fuel temperature})$$

Assuming $Tinlet = T31$ $$\phi pz = \phi LUT(\Delta Tpz, T31)$$

-continued $$\phi tot = \phi LUT(\Delta Ttot, T31)$$

$$WFpz = FARpz \cdot Wpz$$

$$\therefore \phi pz = \frac{FARpz}{FARs}$$

$$WFtot = FARtot \cdot W31$$

$$WFtot = \phi tot \cdot FARs \cdot W31$$

$$\therefore \phi tot = \frac{FARtot}{FARs}$$

Hence $$\frac{WFpz}{WFtot} = \frac{\phi pz}{\phi tot} \cdot \frac{Wpz}{W31}$$

During fuel staging, the variations of humidity and fuel gas properties affect both zones equally and are hence cancelled out. Therefore, the temperature control accuracy is insensitive to fuel type fluctuation and environmental conditions. However, this algorithm uses T405 inferred from T455. Therefore, its performance relies significantly on the accuracy of the schedules and the T455 measurement.

The above discussion makes use of the equivalence ratios and those equivalence ratios may then be used in determining fuel ratio, being the ratio of the fuel supplied to the primary zone with the total fuel supplied to the engine.

However, it can be seen from the above analysis that since the stoichimetric fuel air ratio FARs appears in both φpz and φtot, it will cancel out the calculation and therefore the values of φpz and φtot can also be used. It is also possible to use the fuel/air ratios themselves, the temperature rises, or the fuel flows. The relationships between these quantities is discussed in more detail in a book entitled "Gas Turbine Performance" by P. P. Walsh and P. Fletcher, published by Blackwell Science in March 1998. The disclosure is herein incorporated by reference. In particular, chapter 3 of that book discusses properties of combustion products. Thus, section 3.14 to 3.16 show that enthalpy is a function of temperature and specific heat, sections 3.23 to 3.27 and section 3.2 shows that specific heat and a function of temperature and fuel/air ratio, and section 3.15 shows the combustor temperature rise in a function of fuel/air ratio and combustor inlet temperature.

In particular, specific enthalpy H in a function of temperature T and specific heat CP, i.e.:

Specific Enthalpy (kJ/kg)=$fn$(Temperature (K), CP (kJ/kg·K))

$$H = H0 + \int CPdT \quad (F3.14)$$

I. H0 is an arbitrarily defined datum. The datum is unimportant in gas turbine performance as it is changes in enthalpy that are of interest.

Change in Enthalpy (kJ/kg)=$fn$(Temperature (K), CP (kJ/kg·K))    F3.15 and F3.16

For fully rigorous calculations specific enthalpy must be calculated from formulae F3.26 and F3.27 below:

$$DH = H2 - H1 \quad (F3.15)$$

For calculations to within 1% accuracy then CP at the mean temperature may be used as calculated from formulae F.23 to F3.25:

$$DH = CP^*(T2 - T1). \quad (F3.16)$$

Moreover:

CP For Key Gases(kJ/kg·K)=$fn$(Static Temperature (K))

$$CP = A0 + A1^*TZ + A2^*TZ^2 + A3^*TZ^3 + A4^*TZ^4 + A5^*TZ^5 + A6^*TZ^6 + A7^*TZ^7 + A8^*TZ^8 \quad (F3.23)$$

Where: TZ=TS/1000 and the values for constants are as below:

|     | Dry Air   | $O_2$     | $N_2$     | $CO_2$    | $H_2O$    |
|-----|-----------|-----------|-----------|-----------|-----------|
| A0  | 0.992313  | 1.006450  | 1.075132  | 0.408089  | 1.937043  |
| A1  | 0.236688  | -1.047869 | -0.252297 | 2.027201  | -0.967916 |
| A2  | -1.852148 | 3.729558  | 0.341859  | -0.405549 | 3.338905  |
| A3  | 6.083152  | -4.934172 | 0.523944  | 2.039166  | -3.652122 |
| A4  | -8.893933 | 3.284147  | -0.888984 | -1.163088 | 2.332470  |
| A5  | 7.097112  | -1.095203 | 0.442621  | 0.381364  | -0.819451 |
| A6  | -3.234725 | 0.145737  | -0.074788 | -0.052763 | 0.118783  |
| A7  | 0.794571  |           |           |           |           |
| A8  | -0.081873 |           |           |           |           |
| A9  | 0.422178  | 0.369790  | 0.443041  | 0.366740  | 2.860773  |
| A10 | 0.001053  | 0.000491  | 0.0012622 | 0.001736  | -0.000219 |

Gamma may be then be calculated via formula F3.7

$$\gamma = CP/(CP - R) \quad (F3.7)$$

CP For Combustion Products of Kerosene or Diesel in Dry Air (kJ/kg·K)=$fn$(Fuel Air Ratio, Static Temp (K))

$$CP = A0 + A1^*TZ + A2^*TZ^2 + A3^*TZ^3 + A4^*TZ^4 + A5^*TZ^5 + A6^*TZ^6 + A7^*TZ^7 + A8^*TZ^8 + FAR/(1 + FAR)^*(B0 + B1^*TZ + B2^*TZ^2 + B3^*TZ^3 + B4^*TZ^4 + B5^*TZ^5 + B6^*TZ^6 + B7^*TZ^7) \quad (F3.24)$$

Where: TZ=TS/1000

A0 to A8 are the values for dry air from formula F3.23
B0=-0.718874, B1=8.747481, B2=-15.863157, B3=17.254096, B4=-10.233795, B5=3.081778, B6=-0.361112, B7=-0.003919, B8=0.0555930, B9=-0.0016079, Gamma may be then be calculated via formulae F3.7 above.

CP For Combustion Products of Sample Natural Gas in Dry Air (kJ/kg·K)=$fn$(CP of Liquid Fuel Combustion Products (kJ/kg·K))

$$CPgas = (1.0001 + 0.9248\ FAR - 2.2078^*FAR^2)^*CPliquid \quad (F3.25)$$

Specific Enthalpy For KeyGases(MJ/kg)=$fn$(Temperature (K))

$$H = A0^*TZ + A1/2^*TZ^2 + A2/3^*TZ^3 + A3/4^*TZ^4 + A4/5^*TZ^5 + A5/6^*TZ^6 + A6/7^*TZ^7 + A7/8^*TZ^8 + A8/9^*TZ^9 + A9 \quad (F3.26)$$

Where TZ=T/1000 and the values for constants are as per formula F3.23.

If the change in enthalpy is known and the change in temperature is required, then formulae F3.15 and F3.26 must be used iteratively Specific Enthalpy For Combustion Products of Kerosene or Diesel in Dry Air (MJ/kg)=$fn$(Fuel Air Ratio, Static Temp (K))

$$H = A0^*TZ + A1/2^*TZ^2 + A2/3^*TZ^3 + A3/4^*TZ^4 + A4/5^*TZ^5 + A5/6^*TZ^6 + A6/7^*TZ^7 + A7/8^*TZ^8 + A8/$$

$$9*TZ\char`\^9+A9+(FAR/(1+FAR)*(B0*TZ+B1/\\2*TZ\char`\^2+B2/3*TZ\char`\^3+B3/4*TZ\char`\^4+B4/5*TZ\char`\^5+B5/\\6*TZ\char`\^6+B6/7*TZ\char`\^7+B8) \quad (F3.27)$$

Where: T2Z=T2/1000, T1Z=T1/1000 and the values for constants are as per formula F3.23.

If the change in enthalpy is known and the change in temperature is required, then formulae F3.15 and F3.27 must be used iteratively In addition, FIG. 8 illustrates the relationship between CP, temperature and fuel-air ratio (FAR) for kerosene and FIG. 9 illustrates the relationship between combustor temperature rise, FAR and combustor inlet temperature.

In the enthalpy balance calculations for the combustion zones, values representing likely gas compositions at the inlet and exit of each zone have to be used. However, since ratios are used, the method of the invention is generally insensitive to the values used, and generic values may suffice.

For implementation, the use of equivalence ratio ($\phi$) against temperature rise uses a similar principle and characterises the energy gain by the relationship between $\phi$ and temperature rise. This becomes the simplest approach in term of coding and uses a parameter which is already utilised in the existing control program. Using $\phi$ found from a chart ($\phi$ vs $\Delta T$ and inlet temperature) and the equations discussed above, the fuel flow ratio can be found. Since the fuel flow rate is significantly less than the air flow rate, its temperature effect is insignificant. However, if this effect is to be accounted for, the start temperature for $\Delta T$ calculation can be the temperature of the fuel air mixture before combustion.

For a combustor with more than two combustion zones, the primary fuel flow rate is found first knowing the target primary zone temperature, primary and total air flow rates, and total fuel flow rate.

In practice, the fuel supply is controlled by a valve and the control operation sets the degree of opening of that valve. Thus, the fuel flow rate can be determined using the characteristics of that valve, the gas pressure ratio and the properties of the fuel gas. In the known arrangements, the properties of the fuel gas are determined using a gas chromatograph, but in the present invention, generic values may be used since the effect of the adoption of generic values, rather than measured values, will cancel out, because the present invention involves the use of ratios. Similarly, the gas pressure ratio may be measured, or may be estimated, since any inaccuracy in the estimate will again be cancelled out.

To find the secondary fuel flow rate, the primary and secondary zones have to be treated as one zone with the secondary zone exit gas flow and the same evaluation method can be applied. This will give the sum of the primary and secondary fuel flow rates. Since the primary fuel flow rate is known, the secondary fuel flow rate can be deduced.

Thus, as illustrated in FIG. 6, the ratio of the primary zone equivalence ratio $\phi pz$ to the combustor average equivalence ratio $\phi tot$ is determined, which enables the fuel split ratio to be determined.

In practice, however, it is the temperature of the outlet of the primary zone $T_{PZ}$ that needs to be controlled by controlling the fuel split ratio. Thus, in a control loop., the relationship illustrated in FIG. 6 is operated in reverse, to determine $T_{PZ}$ which is compared with a reference value, and any variation from the reference value is used as a control factor to vary the fuel split ratio to the engine. This is illustrated further in FIG. 7 the temperature $T_{PZ}$ at the outlet of the combustor zone is evaluated at the stage 100 and compared with a reference at stage 101. The result is a signal 102 to the fuel split control 103 which controls the amount of fuel supplied to the primary zone as a proportion of the total fuel supplied. That fuel split control controls the areas of valves at stage 104 which themselves act on the fuel system 105 to control the fuel split in the engine 106. Sensors 107 then sense the factors needed to permit the valuation of $T_{PZ}$ and the evaluation unit 100. FIG. 7 also illustrates that the fuel split control 103 is itself affected by the power demand of the engine, in which a desired power 109 is compared with the feed back signal 110 derived from one of the sensors 107, in a unit 111, to generate a signal to a power control unit 112 which provides an input to the fuel split control 103 representing the total amount of fuel needed.

In a practical situation, the behaviour of an engine is a dynamic quantity, and there are several different ways that this may be taken into account in the present invention. In one alternative, the present invention applied as a "trim" to a known engine control method. In such a situation, the determination of the values made use of by the present invention is carried out repeatedly, at suitable intervals, to generate a series of successive control signals which are used to vary the primary fuel.

The method of the present invention is thus applied as a series of iterations. In this way, changes in the engine behaviour are taken into account over a suitable timescale. In between those iterations, it is still necessary to apply a control system and therefore the arrangements disclosed in EP-B-0680554 may be applied, using values derived from the method of the present invention. Thus, the calculation protocol of EP-B-0680554 is used with values derived by the present invention, and those values are re-determined at each iteration of the method of the invention. In this way, the invention may be considered as being applied as a "trim" to a steady state operation similar to that of EP-B-0680554.

As an alternative, the invention may be modified in known ways, to take transients into account. Then, the dynamic characteristics of the calculated temperature $T_{PZ}$ would include the dynamics of all the parameters used in its evaluation. Since it uses the control loop as feed back to compare with the desired value of $T_{PZ}$, during a transient when fuel flows are being adjusted, the feed back of $T_{PZ}$ will reflect the transient response of fuel flows. Thus, $T_{PZ}$ is evaluated using an energy ratio equation and since ratios are used fuel property information from e.g. a gas chromatograph is not required.

Normally, the temperatures needed in order to make use of the control system envisaged by the present invention will be measured by thermocouple sensors.

During transients, the dynamic responses of the turbine systems and the thermocouples have to be considered. Significant transport delay and thermal lag may exist between the combustor and the thermocouple hot junction.

The dynamic response of the actuator governs the fuel flow rate after the demand signal is received. For control purposes, this dynamic response can be assumed to be a first order lag, i.e. $1/(1+\tau s)$ where $\tau$ is the time constant of the actuator. Downstream of the metering valve, another time delay exists for fuel flow variation to propagate to the combustor. This delay depends on the flow rate of the fuel and the dimensions of the fuel manifold.

The combustion process is very fast compared to the transport delay of the fuel flow. Therefore, the combustion process can be assumed to be instantaneous and the temperature response at the exhaust of the combustion zone (T405) to be the same as the rate of fuel flow change.

Downstream of the combustor, exhaust gases expand through the turbines and their temperature falls. The average temperature of these gases at the exit of the IP turbine (T455) is measured by a set of K-type thermocouples. The response of T455 will always lag behind the temperature change in the combustor due to heat soakage. A transport delay also exists between the temperature change in the combustor and the fluctuation picked up by the thermocouples. This delay is very small due to the high flow rate in the turbines. For the thermocouple itself, the heat conduction rate through the probe has a significant influence on the rate of change of the temperature measured. This will depend on the flow rate of gases over the thermocouple and the temperature of the gases. For control purposes, the dynamic response of thermocouple is again assumed as a first order lag.

The above arguments imply that the dynamics of the system should not be assumed linear over the power range and a succession of different time constants should be used during a large transient.

To improve the temperature estimation and the control performance of the final system, the dynamic characteristics of all the components in the system should be accounted for. This requires knowledge of all the significant time delays and time constants. With a thermodynamic simulation of the engine coupled with its actuator and sensor models, this task can be completed with acceptable accuracy.

Because of the non-linearity of the system, different sets of dynamic characteristics have to be established using test data. These should be found by step changing the input demand at different power levels and monitoring the corresponding changes in engine parameters such as fuel flow rate and T455. Engine dynamic characteristics at other power levels can be found by interpolation between the test points.

Assuming the time constant of T405 to be the same as the time constant of the fuel flow change, it can be found by measuring the fuel flow rate variation against time during a small fuel demand step change. Once this time constant is found, it can be used as the target time constant for T455 to achieve in the same manoeuvre. However, fuel flow measurement by the Corriolis flow meter is particularly slow relative to the dynamic of the combustion temperature. Alternatively fuel pressure (instead of fuel flow), which is measured with a fast pressure transducer, could be used for this exercise.

Assuming the dynamic response of the T455 thermocouples is $1/(1+\tau s)$, delagging can be achieved by multiplying the signals from the thermocouples by $(1+\tau s)$ which contains a derivative term. The unknown thermocouple time constant $\tau$ can be found by comparing the rise time of the result after delagging to the expected rise time of T405 found above. An initial value of 1 second may be used as the time constant of the thermocouple. This value is then trimmed to get a good match of T455 to T405 in terms of rise time. Signal filtering may be required since derivative control can magnify noise in the source signal.

This delagging is carried out by the unit 113 in FIG. 7.

We claim:

1. A method of regulating fuel flow to a combustion turbine engine, said engine having a combustor including an inlet, an outlet, a primary combustion zone and at least one further combustion zone, the total fuel supplied to the combustor being divided between primary fuel supplied to said primary combustion zone and other fuel supplied to said at least one further combustion zone, the resulting of the fuel comprising regulating the fuel ratio of said primary fuel to said total fuel by the steps of a) determining the inlet and outlet temperatures at the inlet and outlet of said combustor;
b) determining a first value representing a first predetermined property of said combustor from said inlet and outlet temperature;
c) determining a second value representing a second predetermined property of the primary combustion zone from the current value of said fuel ratio and said first value;
d) determining the temperature at the outlet of the primary combustion zone from the inlet temperatures and said second value;
e) comparing the temperature at the outlet of the primary combustion zone with a predetermined temperature, thereby to derive a difference value and generating a control signal dependent on said difference value, and
f) varying the primary fuel, thereby to vary said fuel ratio the varying of the primary fuel being such as to vary said control signal corresponding to a reduction in said difference value.

wherein said first predetermined property is one of: the total enthalpy rise in said combustor, the equivalence ratio of said combustor, the fuel/air ratio of said combustor, the temperature rise across said combustor, the fuel flow through said combustor; and said second predetermined property is the corresponding one of: the enthalpy rise in said primary combustion zone, the equivalence ratio of said primary combustion zone, the fuel/air ratio of said primary combustion zone; the temperature rise across said primary combustion zone, or the fuel flow through the primary combustion zone.

2. A method according to claim 1, where the temperature of the outlet of said combustor is determined by measuring the temperature downstream of said outlet and calculating the temperature of said outlet from the measured temperature.

3. A method according to claim 1, wherein said steps are carried out repeatedly at predetermined intervals.

4. A combustion turbine engine having a combustor including an inlet, an outlet, a primary combustion zone and at least one further combustion zone, means for supplying primary fuel to said primary combustion zone, means for supplying other fuel to said at least one further combustion zone, said primary and said other fuel being together the total fuel, and means for regulating the fuel ratio of said primary fuel to said total fuel, said regulating means being arranged to regulate the fuel ratio by:

a) determining the inlet and outlet temperatures at the inlet and outlet of said combustor;
b) determining a first value representing a first predetermined property of said combustor from said inlet and outlet temperature;
c) determining a second value representing a second predetermined property of the primary combustion zone from the current value of said fuel ratio and said first value;
d) determining the temperature at the outlet of the primary combustion zone from the inlet temperatures and said second value;
e) comparing the temperature at the outlet of the primary combustion zone with a predetermined temperature, thereby to derive a difference value and generating a control signal dependent on said difference value, and
f) varying the primary fuel, thereby to vary said fuel ratio the varying of the primary fuel being such as to vary said control signal corresponding to a reduction in said difference value, wherein said first predetermined property is one of: the total enthalpy rise in said combustor, the equivalence ratio of said combustor, the fuel/air ratio of said combustor, the temperature rise across said combustor, the fuel flow through said combustor; and said second predetermined property is the corresponding one of: the enthalpy rise in said primary combustion zone, the equivalence ratio of said primary combustion zone, the fuel/air ratio of said primary combustion zone; the temperature rise across said primary combustion zone, or the fuel flow through the primary combustion zone.

5. A method of scheduling fuel flow to a combustion turbine engine, comprising the steps of putting a plurality of engine fuel flow governors in parallel with each other, letting the governor which outputs the lowest fuel demand signal be the one which schedules the total fuel flow to the engine, characterised in that there are a plurality of combustion stages, defining predetermined temperature limits for the combustion process in each stage of combustion, and individually scheduling fuel flows to the plurality of combustion stages to achieve the lowest fuel flows consistent with the predetermined temperature limits for the corresponding stages of combustion; wherein said engine has a combustor including an inlet, an outlet, a primary combustion zone and at least one further combustion zone, the total fuel supplied to the combustor being divided between primary fuel supplied to said primary combustion zone and other fuel supplied to said at least one further combustion zone; and the method further includes repeatedly and at predetermined intervals:

a) determining the inlet and outlet temperatures at the inlet and outlet of said combustor;

b) determining a first value representing a first predetermined property of said combustor from said inlet and outlet temperature;

c) determining a second value representing a second predetermined property of the primary combustion zone from the current value of said fuel ratio and said first value;

d) determining the temperature at the outlet of the primary combustion zone from the inlet temperatures and said second value;

e) comparing the temperature at the outlet of the primary combustion zone with a predetermined temperature, thereby to derive a difference value and generating a control signal dependent on said difference value, and f) varying the primary fuel, thereby to vary said fuel ratio the varying of the primary fuel being such as to vary said control signal corresponding to a reduction in said difference value, wherein said first predetermined property is one of: the total enthalpy rise in said combustor, the equivalence ratio of said combustor, the fuel/air ratio of said combustor, the temperature rise across said combustor, the fuel flow through said combustor; and said second predetermined property is the corresponding one of: the enthalpy rise in said primary combustion zone, the equivalence ratio of said primary combustion zone, the fuel/air ratio of said primary combustion zone, the temperature rise across said primary combustion zone, or the fuel flow through the primary combustion zone.

* * * * *